(12) United States Patent
Green et al.

(10) Patent No.: US 7,958,529 B2
(45) Date of Patent: Jun. 7, 2011

(54) METHOD OF SHARING AN ITEM RENTAL ACCOUNT

(75) Inventors: Mitchell C. Green, Boulder, CO (US); Neil D. Hunt, Mountain View, CA (US); Joshua R. Evans, Scotts Valley, CA (US); Keith Hawes, San Jose, CA (US); Naresh Gopalani, Fremont, CA (US)

(73) Assignee: Netflix, Inc., Los Gatos, CA (US)

( * ) Notice: Subject to any disclaimer, the term of this patent is extended or adjusted under 35 U.S.C. 154(b) by 53 days.

(21) Appl. No.: 12/559,321

(22) Filed: Sep. 14, 2009

(65) Prior Publication Data

US 2010/0005006 A1    Jan. 7, 2010

Related U.S. Application Data

(63) Continuation of application No. 11/297,115, filed on Dec. 7, 2005, now Pat. No. 7,631,323.

(51) Int. Cl.
*H04N 7/16*    (2006.01)
*G06F 17/00*    (2006.01)
*G06K 15/00*    (2006.01)

(52) U.S. Cl. ............ 725/60; 725/61; 713/165; 709/226; 705/26.8; 235/383

(58) Field of Classification Search .................. 235/383, 235/385; 705/26.1, 26.61, 26.8; 713/165, 713/171; 725/1, 5, 52, 60, 61, 104; 726/26, 27; 709/203, 206, 223, 226

See application file for complete search history.

(56) References Cited

U.S. PATENT DOCUMENTS

| | | | | |
|---|---|---|---|---|
| 4,967,906 A | * | 11/1990 | Morello et al. | ............ 206/387.1 |
| 6,751,736 B1 | * | 6/2004 | Bowman et al. | ............... 713/189 |
| 7,389,243 B2 | * | 6/2008 | Gross | ............................ 705/346 |
| 7,590,546 B2 | * | 9/2009 | Chuang | ........................ 705/1.1 |

\* cited by examiner

*Primary Examiner* — Andrew Joseph Rudy
(74) *Attorney, Agent, or Firm* — Hickman Palermo Truong & Becker LLP; Adam C. Stone

(57) ABSTRACT

An account in an item rental service is shared with others using computer-implemented profiles, subject to computer-enforced constraints. In one embodiment, a method provides for establishing a user account, wherein the user account is associated with an account owner, wherein the user account comprises a first ordered queue indicating two or more items that the account owner desires to rent; receiving a request to add a second ordered queue to the user account, profile member identifying information, and a constraint value; creating and storing a profile record based on the profile member identifying information and the constraint value, wherein the profile record is further associated with a second queue; receiving a request to add a specified rental item to the second queue, wherein the specified rental item does not conform to the constraint value; and adding the specified rental item to the second queue only in response to receiving confirmation by the account owner.

21 Claims, 17 Drawing Sheets

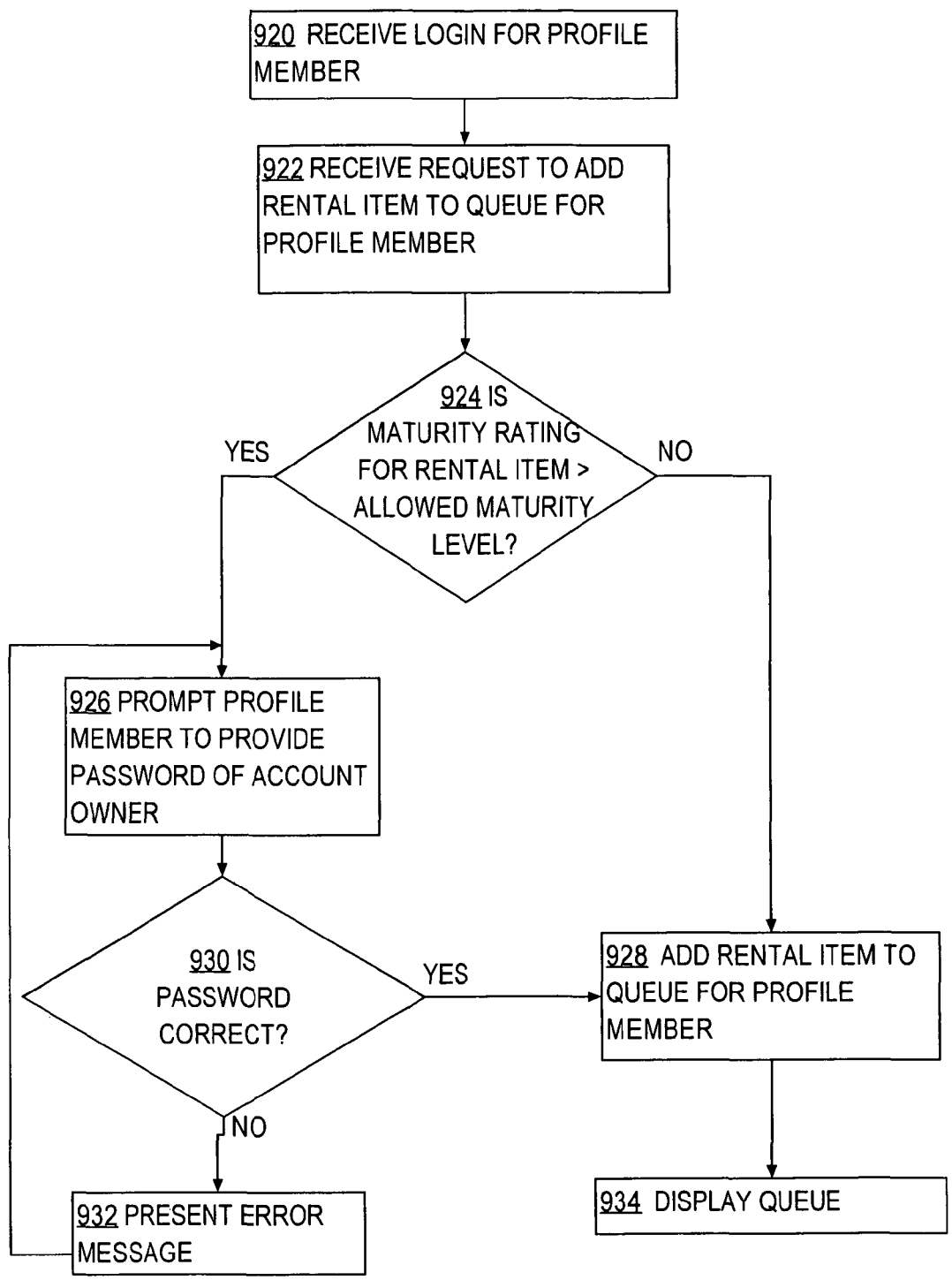

METHOD OF SHARING AN ITEM RENTAL ACCOUNT

CROSS-REFERENCE TO RELATED APPLICATIONS; BENEFIT CLAIM

This application claims benefit as a Continuation of application Ser. No. 11/297,115, filed Dec. 7, 2005 now U.S. Pat. No. 7,631,323, entitled "METHOD OF SHARING AN ITEM RENTAL ACCOUNT", the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention relates to inventory rental, and more specifically, to approaches for sharing item rental accounts.

BACKGROUND

Conventional inventory rental models are typically based upon renting items for fixed rental periods and charging late fees for keeping rented items beyond a specified return date. These types of inventory models suffer from several significant limitations. First, conventional rental models require customers to make the decision of what items to rent at substantially the same time as the decision of when to rent the items. An example that illustrates this limitation is a video rental business. Customers go to a video rental store and select particular movies to rent at that time. The customers take the movies home and must return them by a particular due date or be charged a late fee. In this situation, the customers cannot decide what movies to rent before actually renting them. The customers may have a particular movie in mind, but there is no guarantee that the video rental store has the particular movie in stock. Moreover, due dates are inconvenient for customers, particularly for "new release" movies that are generally due back the next day.

Given the current demand for inventory rental and the limitations in the prior approaches, an approach for renting items to customers that does not suffer from limitations associated with conventional inventory rental models is highly desirable. In particular, an approach for renting inventory items to customers that allows separation of customers' decisions of what items to rent from when to rent the items is highly desirable.

There is a further need for an approach for renting items to customers on a continuous basis that avoids the use of fixed due dates or rental "windows" appurtenant to conventional rental models.

There is yet a further need for an approach for renting movies, games and music to customers that is more convenient and flexible to customers than conventional approaches.

In certain online rental approaches, customers who desire to rent items from an online rental service establish an account with the rental service, pay a fee, and establish a queue of rental items. A limitation of this approach is that in a multi-person household, such as a family household, each family member is required to establish a separate account with the service. This approach limits the ability for one member of the household, such as a parent, to view or control the contents of a rental queue established by another member of the household, such as a child. For example, in online movie rental, a parent may wish to prevent a child from adding movies that have MPAA (Motion Picture Association of America) ratings of "PG-13", "R", or "NC-17" to the child's queue. Another drawback of this approach is that it limits the ability for any member of the household to enter their own ratings for any movie and receive personalized recommendations based on those ratings.

Further, the use of individual accounts for multiple persons in a household reduces barriers to changing service providers. When each person in a household has his or her own account with the service provider, any of the persons may elect to change to a competitive service provider without significant effect on the other persons. Service providers would like to create a disincentive for such change.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 9C is a flow diagram of processing a request to add a rental item to a profile member queue.

DETAILED DESCRIPTION

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

Various aspects and features of example embodiments of the invention are described in more detail hereinafter in the following sections: (1) functional overview; (2) item selection criteria; (3) item delivery; (4) "Max Out"; (5) "Max Turns"; (6) inventory management; (7) implementation mechanisms; (8) sharing an item rental account.

1. Functional Overview

Figure 1:
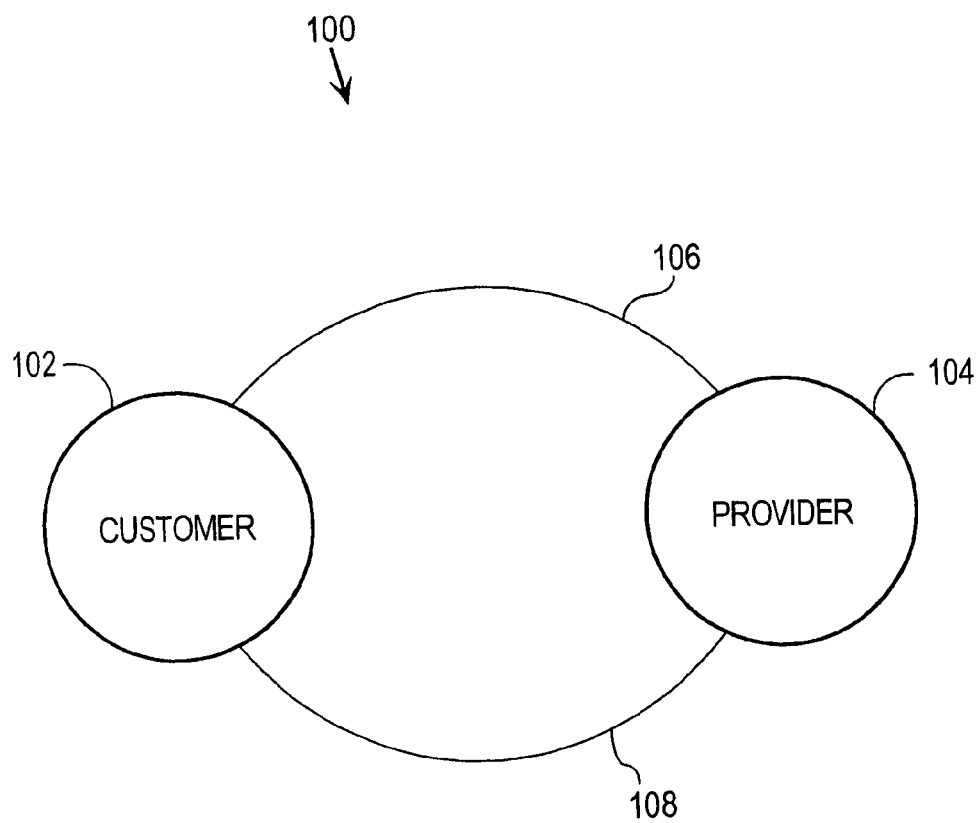
FIG. 1 is a diagram depicting an approach for renting items to customers according to an embodiment.

FIG. 1 is a block diagram 100 that illustrates an approach for renting items to customers according to various embodiments described herein. As used herein, the term "items" refers to any commercial goods that can be rented to customers. Examples of items include movies, music and games stored on a non-volatile memory such as a tape, other magnetic medium, optical medium, read-only memory or the like, and the invention is not limited to any particular type of item. In general, the decision of what items to rent is separated from the decision of when to rent the items. Customers may specify what items to rent using one or more item selection criteria separate from deciding when to receive the specified items. Furthermore, customers are not constrained by conventional rental "windows" and instead can have continuous, serialized rental of items.

According to one embodiment, a customer 102 provides one or more item selection criteria to a provider 104 over a link 106. Link 106 may be any medium for transferring data between customer 102 and provider 104 and the invention is not limited to any particular medium. Examples of link 106 include, without limitation, a network such as a LAN, WAN or the Internet, a telecommunications link, a wire or optical link or a wireless connection.

The item selection criteria indicate items that customer 102 desires to rent from provider 104. In response to receiving the item selection criteria from customer 102, provider 104 provides the items indicated by the item selection criteria to customer 102 over a delivery channel 108. Delivery channel 108 may be implemented by any mechanism or medium that provides for the transfer of items from provider 104 to customer 102 and the invention is not limited to any particular type of delivery channel. Examples of delivery channel 108 include, without limitation, mail delivery, courier delivery or delivery using a delivery agent. Provider 104 may be centralized or distributed depending upon the requirements of a particular application.

According to an embodiment, a "Max Out" approach allows up to a specified number of items to be rented simultaneously to customer 102 by provider 104. According to another embodiment, a "Max Turns" approach allows up to a specified number of item exchanges to occur during a specified period of time. The "Max Out" and "Max Turns" approaches may be used together or separately with a variety of subscription methodologies.

Figure 2:
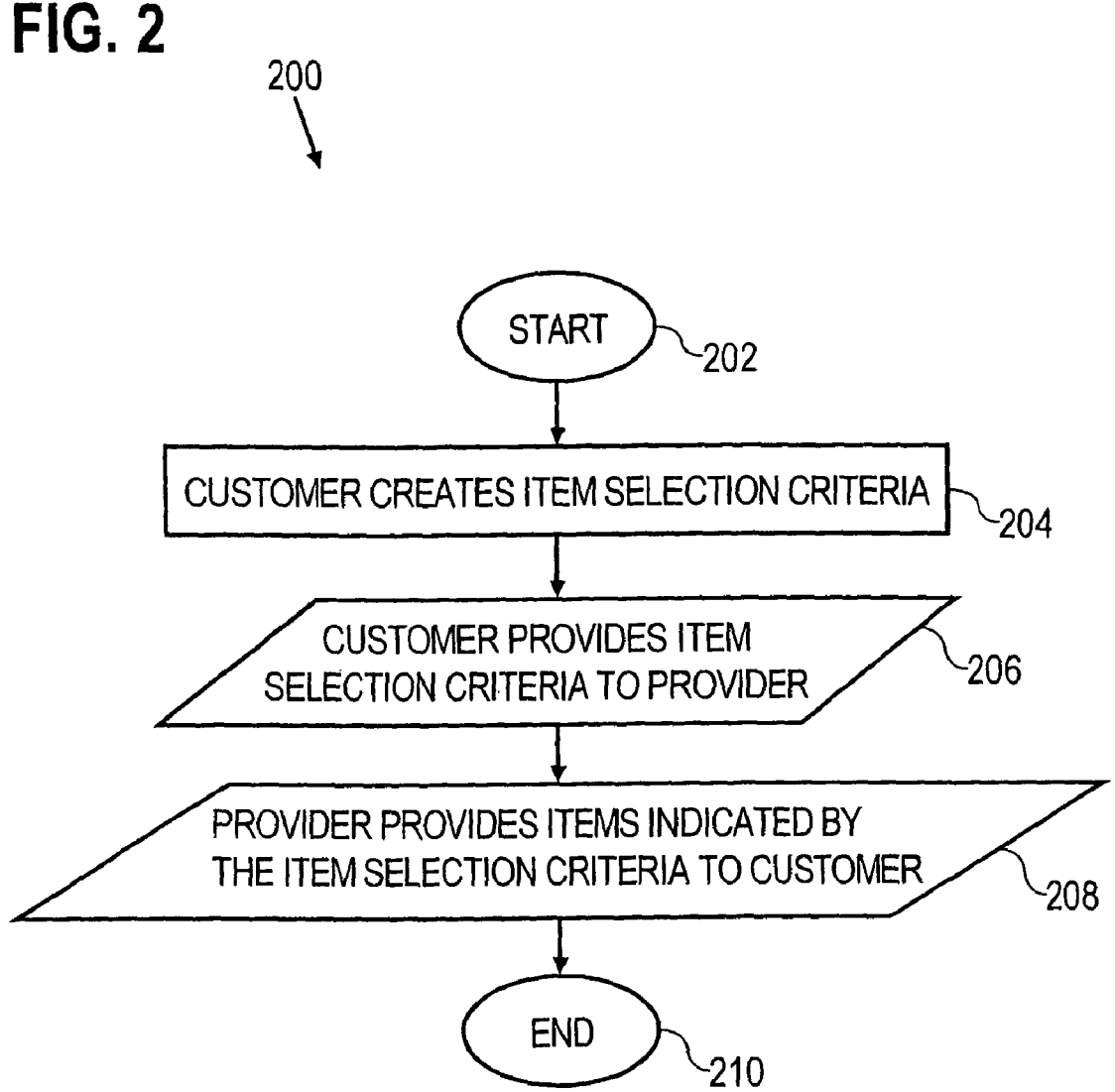
FIG. 2 is a flow diagram depicting an approach for renting items to customers according to an embodiment.

The approach just described for renting items to customers is now described with reference to a flow diagram 200 of FIG. 2. After starting in step 202, in step 204, customer 102 creates item selection criteria. In step 206, customer 102 provides the item selection criteria to provider 104. In step 208, in response to provider 104 receiving the item selection criteria from customer 102, provider 104 provides one or more items indicated by the item selection criteria to customer 102. The process is complete in step 210.

2. Item Selection Criteria

The one or more item selection criteria provided by customer 102 to provider 104 indicate the particular items that customer 102 desires to rent from provider 104. Thus, the item selection criteria define a customer-specific order queue that is fulfilled by provider 104. According to one embodiment, the item selection criteria specify attributes of items to be provided by provider 104 to customer 102. Item selection criteria may specify any type of item attributes and the invention is not limited to particular item attributes. Examples of item attributes include, without limitation, identifier attributes, type attributes and cost attributes. Item selection criteria may be changed at any time to reflect changes in items that customers desire to rent from a provider.

3. Item Delivery

According to one embodiment, items are delivered by provider 104 to customer 102 over delivery channel 108 based upon item delivery criteria. More specifically, the delivery of items from provider 104 to customer 102 is triggered by item delivery criteria being satisfied. The item delivery criteria may include a wide range of criteria and the invention is not limited to any particular item delivery criteria. Examples of item delivery criteria include, without limitation, customer request/notification, customer notification that an item is being returned, customer return of an item, the occurrence of a specified date, the elapsing of a specified period of time or a customer payment.

The item delivery criteria may be specified by customer 102 to provider 104 or negotiated by customer 102 and provider 104 as part of a subscription service. For example, a particular subscription service may include item delivery criteria that specifies that a particular number of items are to be delivered monthly. As another example, item delivery criteria may specify that an initial set of items is to be delivered by provider 104 to customer 102 upon initiation of a subscription service and that additional items are to be delivered to customer 102 upon return of items to provider 104. Item delivery criteria may be applied uniformly to all items to be delivered to a customer, or may be item specific. For example, item delivery criteria may specify a particular date, i.e., the third Wednesday of every month, for all item deliveries. Alternatively, separate item delivery dates may be assigned to each item.

4. "Max Out"

According to one embodiment, a "Max Out" approach is used to manage the number of items that may be simultaneously rented to customers. According to the "Max Out" approach, up to a specified number of items may be rented simultaneously to a customer. Thus, the "Max Out" approach establishes the size of an inventory of items that may be maintained by customers. The specified number of items may be specific to each customer or may be common to one or more customers. In the present example, if the specified number of items is three, then up to three items may be rented simultaneously by provider 104 to customer 102. If the specified number of items are currently rented to customer 102 and the specified item delivery criteria triggers the delivery of one or more additional items, then those items are not delivered until one or more items are returned by customer 102 to provider 104.

According to one embodiment, in situations where the specified number of items are currently rented to customer 102 and the specified item delivery criteria triggers the delivery of one or more additional items, then the one or more additional items are delivered to customer 102 and customer 102 and a surcharge is applied customer 102. The specified number of items may then be increased thereafter to reflect the additional items delivered to customer 102 and increase the size of the inventory maintained by customer 102. Alternatively, the specified number of items may remain the same and number of items maintained by customer 102 returned to the prior level after items are returned to provider 104 by customer 102. When used in conjunction with the "Max Turns" approach described hereinafter, the specified number of items may be unlimited.

Figure 3:
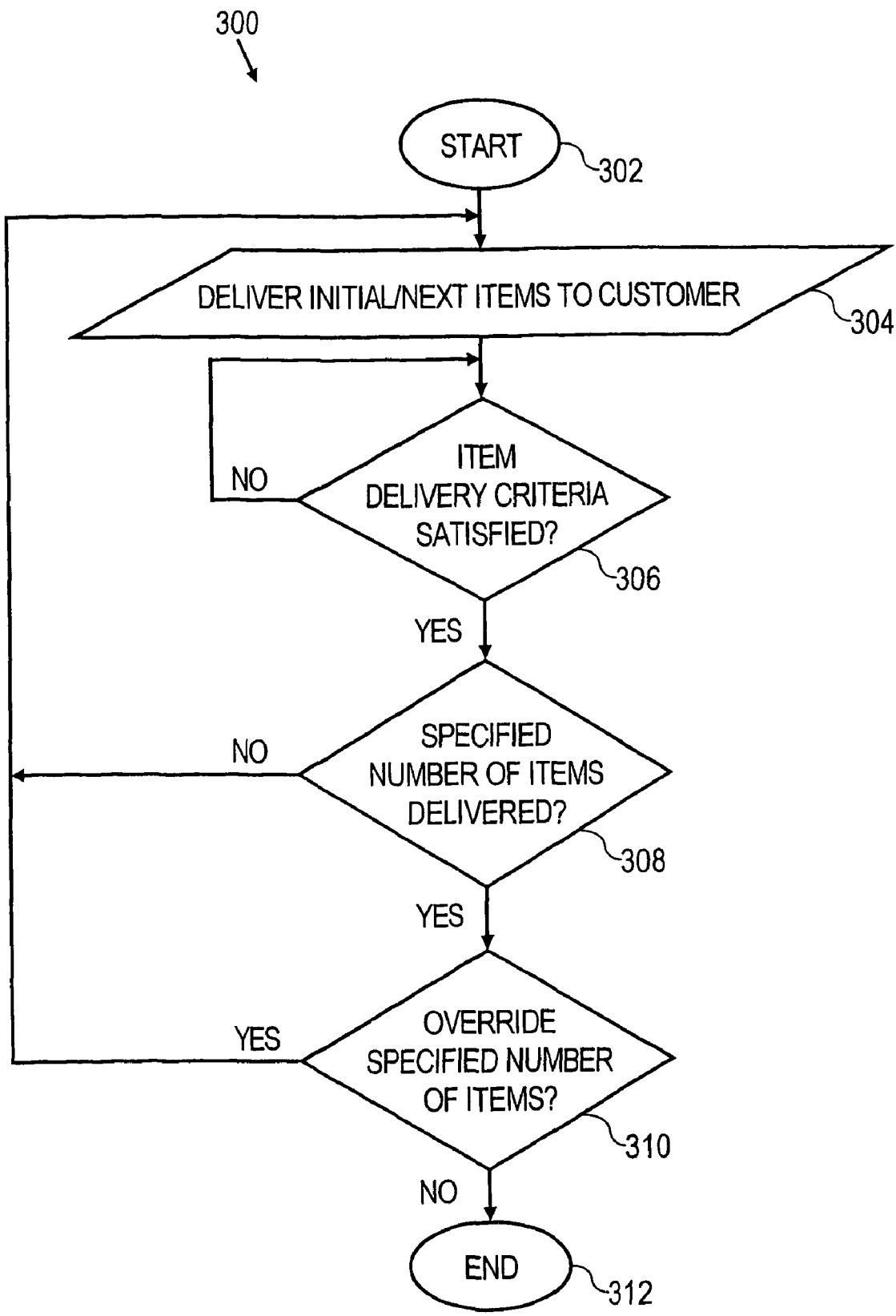
FIG. 3 is a flow diagram depicting a "Max Out" approach for renting items to customers according to an embodiment.

The "Max Out" approach for managing the number of items that may be simultaneously rented to customers is now described with reference to a flow diagram 300 of FIG. 3. After starting in step 302, in step 304, one or more initial items are delivered to customer 102 to establish the inventory maintained by customer 102. Note that an initial delivery of items is not required and according to one embodiment, the inventory of customer 102 is incrementally established over time.

In step 306, a determination is made whether the item delivery criteria have been satisfied. If not, then the determination continues to be made until the item delivery criteria are satisfied. As described previously herein, the delivery criteria may include customer notification generally, customer notification that an item is being returned, the actual return of an item, the occurrence of a specific date, or that a specified amount of time has elapsed.

Once the item delivery criteria are satisfied, then in step 308, a determination is made whether the specified number of items have been delivered. If not, then control returns to step 304 and one or more additional items are delivered by provider 104 to customer 102. If however, in step 308, the specified number of items have been delivered, then in step 310, a determination is made whether the specified number of items, i.e., the "Max Out" limit, is to be overridden. As previously described, the specified number of items may be overridden by increasing the specified number of items, i.e., the "Max Out" limit, to allow additional items to be delivered to customer 102 and charging a fee to customer 102. Alternatively, the specified number of items is not changed and a surcharge applied to customer 102. This process continues for the duration of the subscription and is then complete in step 312.

5. "Max Turns"

According to one embodiment, a "Max Turns" approach is used to rent items to customers. According to the "Max Turns" approach, up to a specified number of item exchanges may be performed during a specified period of time. For example, referring to FIG. 1, suppose that provider 104 agrees to rent items to customer 102 with a "Max Turns" limit of three items per month. This means that customer 102 may make up to three item exchanges per month. This approach may be implemented independent of the number of items that a customer may have rented at any given time under the "Max Out" approach. The approach is also independent of the particular item delivery criteria used.

According to one embodiment, the "Max Turns" approach is implemented in combination with the "Max Out" approach to rent items to customers. In this situation, up to a specified number of total items are simultaneously rented to customer 102 and up to a specified number of item exchanges may be made during a specified period of time. Thus, using the "Max Out" and the "Max Turns" approaches together essentially establishes a personal item inventory for customer 102 based upon the "Max Out" limit that may be periodically refreshed based upon the "Max Turns" limit selected.

In some situations, customer 102 may wish to exchange more than the specified number of items during a specified period. According to one embodiment, in this situation, provider 104 agrees to rent additional items above the specified number to customer 102 and to charge customer 102 for the additional items. For example, suppose that provider 104 agrees to rent items to customer 102 with up to three item turns (exchanges) per month. If, in a particular month, customer 102 requires two additional turns, then the two additional items are provided to customer 102 and a surcharge is applied to customer 102 for the additional two items.

In other situations, customer 102 may not use all of its allotted turns during a specified period. According to one embodiment, customers lose unused turns during a subscription period. For example, if customer 102 has a "Max Turns" limit of four item exchanges per month and only makes two item exchanges in a particular month, then the two unused exchanges are lost and cannot be used. At the start of the next month, customer 102 would be entitled to four new item exchanges.

According to another embodiment, customers are allowed to carry over unused turns to subsequent subscription periods. For example, if customer 102 has a "Max Turns" limit of four item exchanges per month and only makes two item exchanges in a particular month, then the two unused exchanges are lost and cannot be used. At the start of the next month, customer 102 would be entitled to six new item exchanges, two from the prior month and four for the current month.

Figure 4:
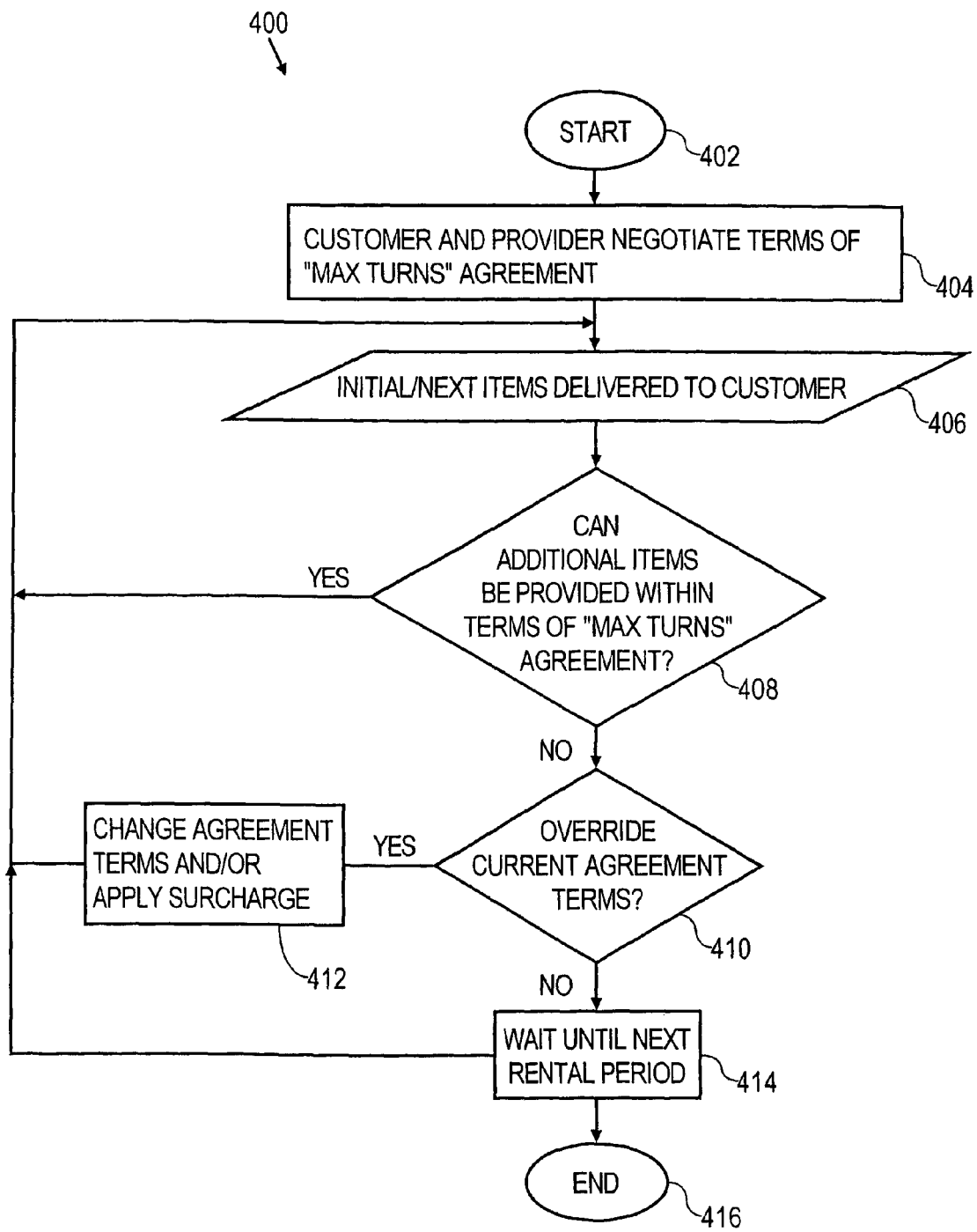
FIG. 4 is a flow diagram depicting a "Max Turns" approach for renting items to customers according to an embodiment.

The "Max Turns" approach for renting items to customers is now described with reference to a flow diagram 400 of FIG. 4. After starting in step 402, in step 404, customer 102 and provider 104 agree upon the terms of the "Max Turns" agreement. Specifically, customer 102 and provider 104 agree at least upon the maximum number of turns that are allowed in a specified period of time.

In step 406, in response to one or more item delivery criteria being satisfied, provider 104 provides one or more items to customer 102 over delivery channel 108. Any type of item delivery criteria may be used with the "Max Turns" approach and the invention is not limited to any particular delivery criteria. For example, the initial one or more items may be delivered to customer 102 in response to a subscription payment made by customer 102 to provider 104, the initiation of a specified subscription period, or by request of customer 102 for the initial rental items. The number of initial one or more items must not exceed the terms of the "Max Turns" agreement.

In step 408, in response to one or more delivery criteria being satisfied, a determination is made whether additional items can be provided to customer 102 within the terms of the "Max Turns" agreement. For example, if the number of items rented to customer in the current subscription period is less than the agreed-upon "Max Turns," then additional items can be rented to customer 102 within the terms of the "Max Turns" agreement. In this situation, this determination may be made in response to customer 102 returning one or more items to provider 104, or by customer 102 requesting additional items.

If, in step 408, a determination is made that additional items can be rented to customer 102 within the terms of the "Max Turns" agreement, then control returns to step 406 where one or more additional items are rented to customer 102. If however, in step 408, a determination is made that additional items cannot be rented to customer 102 within the terms of the "Max Turns" agreement, then in step 410, a determination is made whether to override the current agreement terms. If so, then in step 412, the agreement terms are changed to allow for a larger number of terms and customer 102 is charged accordingly, or the terms are left unchanged and a surcharge is applied for the additional items to be delivered. Control then returns to step 406, where one or more additional items are delivered to customer 102.

If in step 410, a determination is made that the current agreement is not to be overridden, then in step 414, no items are delivered to customer 102 until the next subscription period. For example, the request for additional items may be received at the end of a subscription period and instead of renting the additional items immediately, they are instead delivered during the subsequent subscription period. Control then returns to step 406 where one or more additional items are rented to customer or the process is complete in step 416.

Figure 5:
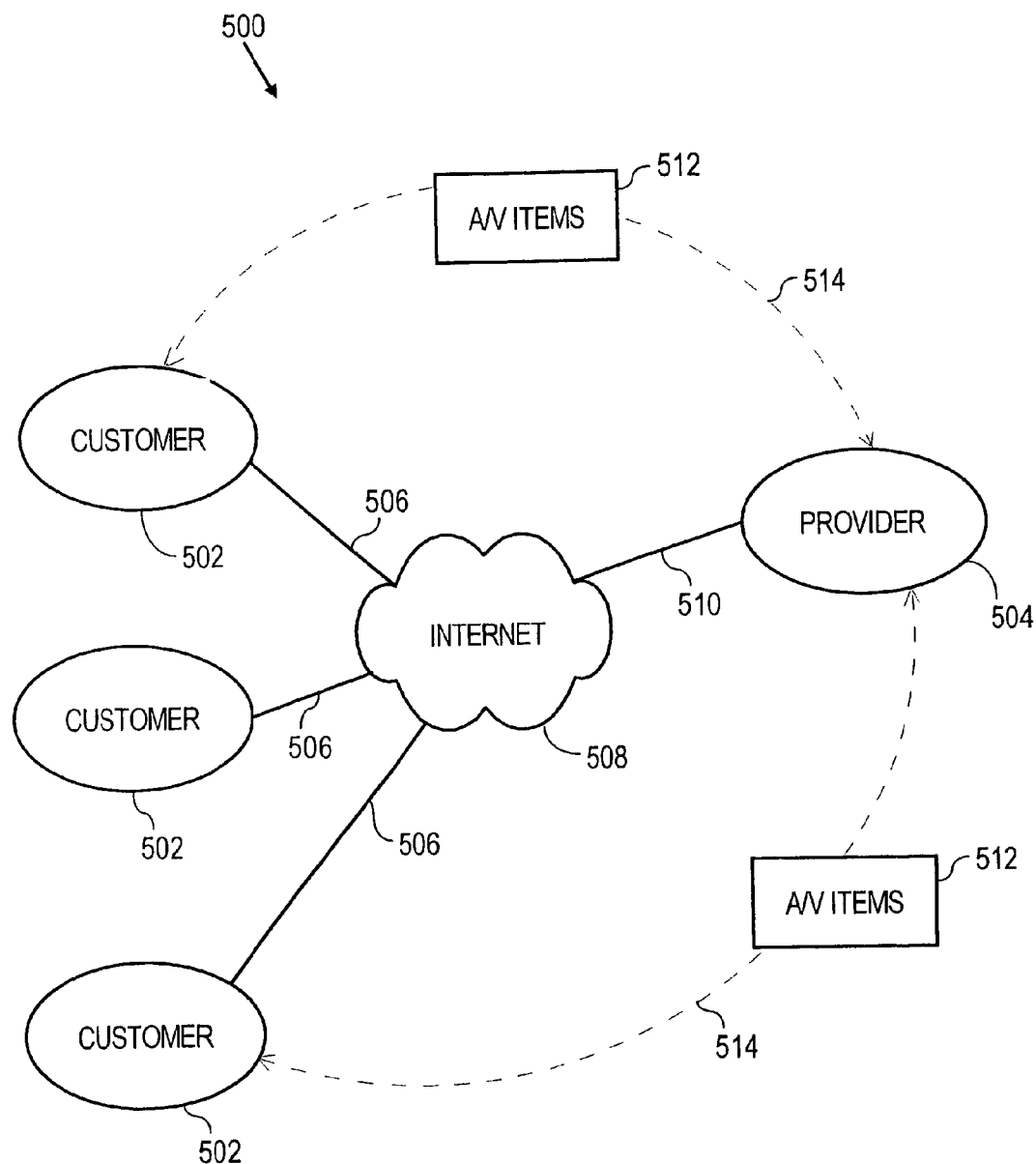
FIG. 5 is a diagram depicting an approach for renting audio/video items to customers over the Internet according to an embodiment.

The approach for renting items described herein is now described in the context of renting to customers audio/video (A/V) items, such as movies, games and music, stored on various media. FIG. 5 is a diagram 500 that depicts a set of customers 502 that desire to A/V items from a provider 504. Customers 502 communicate with provider 504 over links 506, the global packet-switched network referred to as the "Internet," and a link 510.

Links 506 and 510 may be any medium for transferring data between customers 502 and the Internet 508 and between the Internet 508 and provider 504, respectively, and the invention is not limited to any particular medium. In the present example, links 506 and 510 may be connections provided by one or more Internet Service Providers (ISPs) and customers 502 are configured with generic Internet web browsers. Links 506 and 510 may be secure or unsecured depending upon the requirements of a particular application.

In accordance with an embodiment, customers 502 enter into a rental agreement with provider 504 to rent audio/video (A/V) items 512 from provider 504 according to the "Max Out" and/or "Max Turns" approaches described herein. The invention is not limited to any particular approach for entering into the rental agreement. For example, customers 502 and provider 504 may enter into a rental agreement by mail, telephone or over the Internet, by customers 502 logging into a web site associated with provider 504.

Customers 502 create and provide item selection criteria to provider 504 over links 506 and 510 and the Internet 508. The invention is not limited to any particular approach for specifying and providing item selection criteria to provider 504. For example, according to one embodiment, customers 502 provide item selection criteria to provider 504 in one or more data files. According to another embodiment, customers 502 log onto a web site of provider 504 and use a graphical user interfaced (GUI) to specify attributes of the movies and music that customers 502 desire to rent from provider 504.

The item selection attributes may include any attributes that describe, at least in part, movies, games or music that customers 502 desire to rent. For movies, example attributes include, without limitation, title, category, director name, actor name and year of release. For games, example attributes include, without limitation, title and category. For music, example attributes include, without limitation, title, category, artist/group name and year of release. Customers 502 may identify specific movies or music by the item selection criteria, or may provide various attributes and allow provider 504 to automatically select particular movies and music that satisfy the attributes specified. For example, customers 502 may specify item selection criteria that include horror movies released in 1999 and let provider 504 automatically select horror movies that were release in 1999. As another example, customers 502 may specify item selection criteria that include adventure movies starring Harrison Ford. Customers 502 may also specify an order or priority for the specified item selection criteria. For example, customers 502 may specify specific movie titles and the order in which they want to receive them. As another example, customers 502 may specify that they want to receive a particular number of movies of different types.

Once customers 502 and provider 504 have entered into a rental agreement and customers 502 have provided item selection criteria to provider 504, then A/V items 512 are rented to customers 502 over delivery channels 514 in accordance with the terms of the rental agreement. Specifically, according to the "Max Out" approach described herein, an initial set of A/V items 512, such as movies, games and music, are delivered to customers 502 over delivery channels 514 according to the terms of the rental agreement. Subsequent A/V items 512 are delivered whenever the specified item delivery criteria are satisfied. For example, additional A/V items 512 may be delivered upon the return of one or more A/V items 512 to provider, a request from customers 502, the arrival of a particular date, e.g., a specific day of the month, or the expiration of a specified period of time, e.g., fifteen days.

In accordance with the "Max Out" approach described herein, once the maximum number of A/V items 512 have been rented to a particular customer 502, then no additional A/V items 512 are rented until one or more rented A/V items 512 are returned to provider 504, or unless a surcharge is applied to the particular customer 502. Alternatively, the rental agreement between the particular customer 502 and provider 504 may be modified to increase the maximum number of A/V items 512 that may be rented simultaneously to the particular customer 502.

The rental agreement between customers 502 and provider 504 may also specify a maximum number of turns in combination with the "Max Turns" approach. In this situation, a maximum number of turns restricts how quickly customers 502 may refresh their A/V item 512 inventories. For example, suppose that a particular customer 502 agrees with provider 504 to rent up to four movies with a maximum of four turns per month. Under this agreement, the particular customer 502 may maintain a personal inventory of up to four movies and rent four new movies per month. Thus, the particular customer 502 can completely "replace" his personal inventory once per month. If the particular customer 502 agreed to a maximum of up to eight turns per month, then the particular customer 502 would be able to completely replace his personal inventory twice per month.

Provider 504 is illustrated as a single entity for purposes of explanation only. Provider 504 may be centralized or distributed depending upon the requirements of a particular application. For example, provider 504 may be a central warehouse from which all A/V items 512 are provided. Alternatively, provider 504 may be implemented by a network of distributed warehouses.

Figure 6:
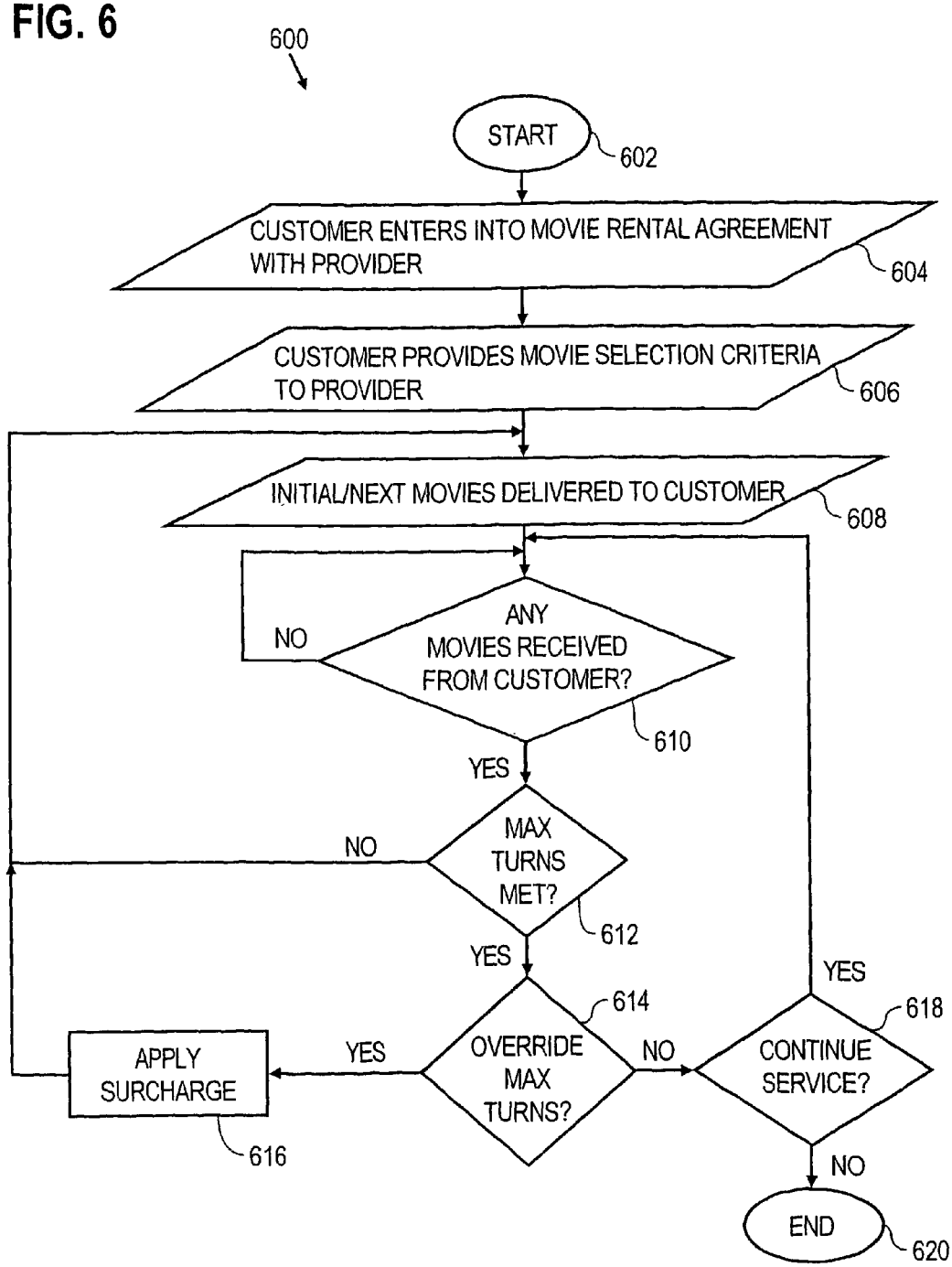
FIG. 6 is a flow diagram illustrating an approach for renting audio/video items to customers over the Internet using both "Max Out" and "Max Turns" according to an embodiment.

FIG. 6 is a flow diagram that illustrates an approach for renting A/V items 512, e.g., movies, to customers over a communications network such as the Internet using both "Max Out" and "Max Turns" according to an embodiment. Referring also to FIG. 5, after starting in step 602, in step 604, a customer 502 enters into a rental agreement with provider 504. In the present example, customer 502 uses a generic web browser to access an Internet web site associated with provider 504 and enter into a rental agreement that specifies that customer 502 may maintain a personal inventory of four movies ("Max Out" of four) and receive up to four new movies per month ("Max Turns" of four). Furthermore, the rental agreement specifies that new movies will be delivered upon return of a rented movie from customer 502, i.e., the delivery criteria is a return of a movie by the customer.

In step 606, customer 502 creates and provides movie selection criteria to provider 504 that indicates movies that customer 502 desires to rent. For example, the movie selection criteria may specify particular movie titles that customer 502 desires to rent. The movie selection criteria may also specify an order or priority in which customer 502 wishes to rent the movies. Instead of identifying particular movie titles, the movie selection criteria may specify movie preferences for customer 502, e.g., types of movies, directors, actors, or any other movie preferences or attributes. In this situation, provider 504 automatically selects particular titles that satisfy the movie selection criteria. For example, the movie selection criteria may specify a preference for action movies starring a particular actor, with a preference for "new release" movies. Provider 504 attempt to provide movies to customer 502 that best satisfy the preferences indicated by the movie selection criteria.

In step 608, one or more initial movies 512 are delivered to customer 502 over delivery channel 514. The one or more initial movies 512 may be delivered to customer 502 via mail, courier, delivery agent or any other suitable means negotiated between customer 502 and provider and the invention is not limited to any particular type of delivery mechanism. For purposes of explanation only, is presumed in the present example that movies are mailed between customer 502 and provider 504.

The one or more initial movies 512 establish the personal movie inventory of customer 502. Customer 502 may choose to receive any number of movies up to the "Max Out" limit of four movies. Typically, customer 502 will choose to initially receive four movies in the initial delivery.

Once the one or more initial movies 512 have been mailed to customer 502, then in step 610, a determination is made whether any movies 512 have been returned by customer 502 to trigger another movie delivery. In the present example, the delivery of additional movies is triggered by the receipt, e.g., via mail, of one or more movies from customer 502. In the situation where customer 502 elects to not receive the maximum number of movies 512 in the initial delivery, then the delivery of additional movies 512 may also be triggered by a request from customer 502 for additional movies 512. For example, customer 502 may notify provider 504 via telephone, email or by accessing the web site associated with provider 504.

If, in step 610, a determination is made that one or more movies 512 were received from customer 502, then in step 612, a determination is made whether the maximum number of turns ("Max Turns") limit has been reached for the current cycle. In the present example, a determination is made whether four or more movies have been mailed in the current month. If not, then control returns to step 608, where one or more additional movies 512 are mailed to customer 502 via delivery channel 514 up to the "Max Out" limit of four.

If, in step 612, a determination is made that the "Max Turns" limit has been met for the current cycle, i.e., in the present example, four movies 512 have been mailed to customer 502 in the current month, then in step 614 a determination is made whether to override the current "Max Turns" limit. If so, then in step 616, a surcharge is applied to customer 502 and control returns to step 608 where the additional movies 514 are mailed to customer 502. If not, then in step 618, a determination is made whether to continue the subscription service. If so, then no additional movies are mailed to customer 502 during the current cycle, e.g., the current month, and the control returns to step 610. If, in step 618, a determination is made that service is not to be continued, then the process is complete in step 620.

In some situations, customer 502 may desire to increase or decrease the size of customer's 502 personal movie inventory by changing the current "Max Out" limit. According to one embodiment, customer 502 notifies provider 504, e.g., by telephone, mail, email or by accessing the web site associated with provider 504, that customer 502 wishes to change the "Max Out" limit. The movie rental agreement between customer 502 and provider 504 is then modified to reflect the change of the "Max Out" limit. In the situation where the "Max Out" limit is increased, then additional movies 512 may be immediately mailed to customer 502.

6. Inventory Management

The approach described herein for renting items to customers provides superior inventory management to prior approaches. Specifically, the use of item selection criteria provides for efficient inventory management by allowing the greatest number of items to be rented at any given time. Moreover, the greatest number of customers are provided with their most preferred items. For example, customers may specify priorities for the items indicated by the item selection criteria. Thus, if a particular customer's first choice is not available, or already rented, then the item having the next highest priority can be rented to the particular customer. According to one embodiment, customers may indicate items that are not yet available for rent. Then, the items are delivered to customers when they become available.

For example, referring again to FIG. 5, suppose that a particular customer 502 desires to rent an as-yet-unreleased movie entitled "ABC." The particular customer 502 indicates this movie to provider 504 by the item selection criteria. Since the movie ABC is not yet available, it cannot be delivered to the particular customer 502. However, when the movie ABC does become available, it can be shipped immediately to the particular customer 502, as well as other customers 502 who may have also requested the movie. This allows provider 504 to maximize the number of items rented while ensuring that customers 502 are able to rent the highest priority items that they requested.

According to another embodiment, as yet unknown items may also be rented by specifying attributes of the unknown items. For example, the particular customer 502 may request to rent the next new movie of a particular director, for which the exact name is unknown to the particular customer. As another example, the particular customer 502 may request to rent the next album of a particular group that is currently in process and does not yet have a title.

7. Implementation Mechanisms

The approach described herein for renting items to customers is applicable to any type of rental application and (without limitation) is particularly well suited for Internet-based rental applications for renting movies and music to customers. The invention may be implemented in hardware circuitry, in computer software, or a combination of hardware circuitry and computer software and is not limited to a particular hardware or software implementation.

Figure 7:
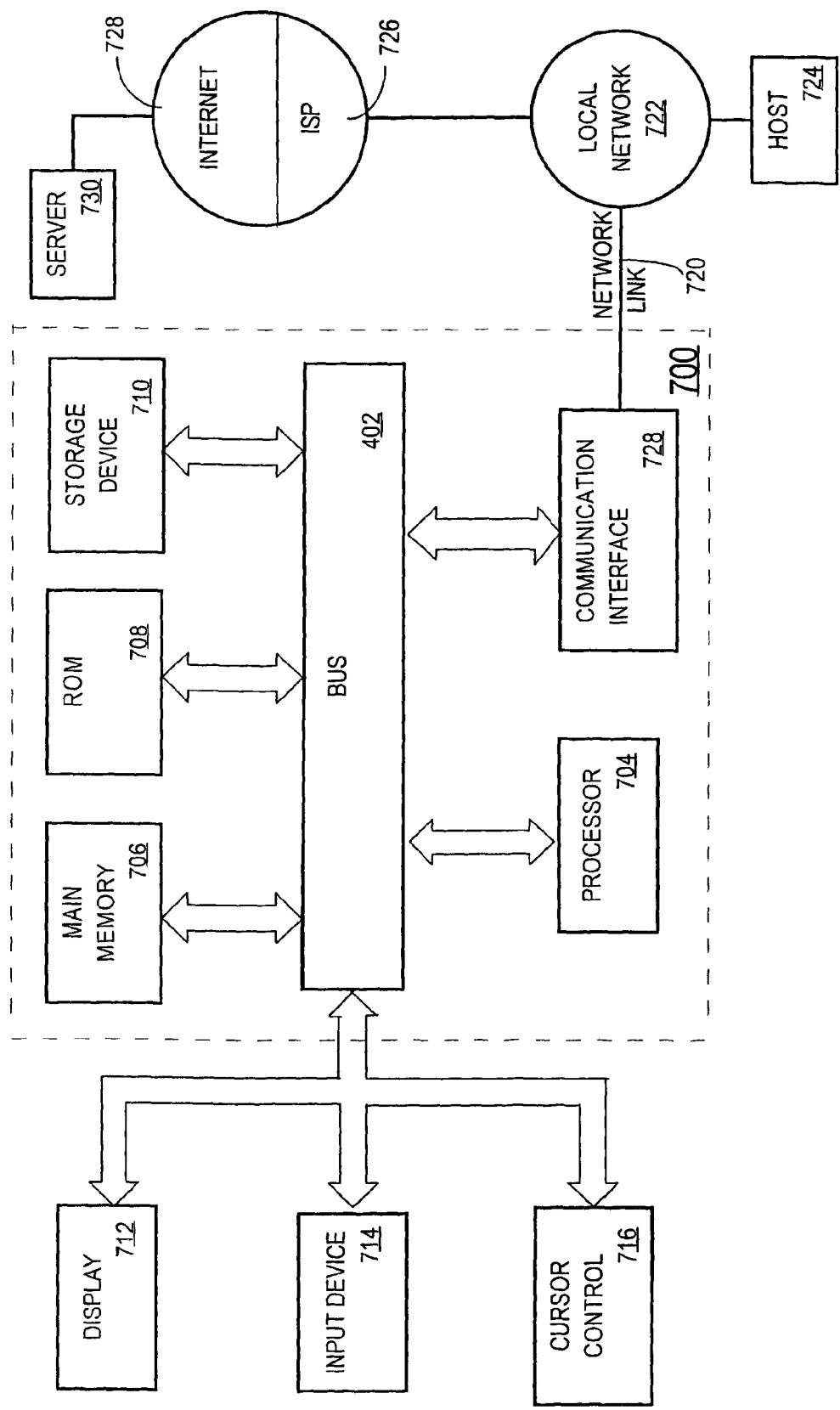
FIG. 7 is a block diagram of a computer system upon which embodiments of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for renting items to customers. According to one embodiment of the invention, the renting of items to customers is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for the renting of items to customers as described herein.

The received code may be executed by processor 704 as it is received, and/or stored in storage device 710, or other non-volatile storage for later execution. In this manner, computer system 700 may obtain application code in the form of a carrier wave.

The novel approach described herein for renting items to customers provides several advantages over prior approaches for renting items to customers. First, the decision of what items to rent may be separated from the decision of when to rent the items. Customers may specify what items to rent using the item selection criteria and receive the items at a future point in time, without having to go to the provider to pick up the items. The selection criteria may be user specific and may indicate a desired fulfillment sequence. Furthermore, customers are not constrained by conventional due dates and instead may establish continuous, serialized rental streams of items. The approach also allows more efficient inventory management.

The "Max Out" approach for inventory management allows users to maintain their own inventory of items that are periodically replaced by other items according to specified event criteria. The event criteria that trigger sending another item to a customer are very flexible and may be tailored to the requirements of a particular application. For example, as described herein, the event criteria may include a return of any of the items currently in use by the customer or merely customer notification. This is very convenient in the context of movie rentals since the return of a movie to the provider automatically triggers the sending of another movie to the customer. The "Max Turns" approach for inventory management, when used alone or in combination with "Max Out," provides even greater flexibility for customers and providers. The max number of turns can be selected individually for particular customers depending upon their particular needs.

The "Max Out" and "Max Turns" approaches provide great flexibility in establishing subscription models to satisfy the needs of a particular application. Specifically, the size and replacement frequency of customer inventories can be tailored to each customer with individualized subscription plans.

In the foregoing specification, the invention has been described as applicable to an implementation anticipating Internet based ordering and mail or other long-distance delivery of the items, where the special advantages of the method are very attractive. However the same invention may be applied in a more conventional video, games, or music rental-store setting, where subscription customers may be allowed rentals of a specified number of movies, games, or music selections at any time, and/or in one subscription period, without rental return due dates, in exchange for a periodic rental subscription fee.

8. Sharing an Item Rental Account

8.1 Overview of Profiles Approach

In one embodiment, a method of sharing an item rental account is provided. Sharing an item rental account may comprise establishing a unique user identity for each of two or more persons in association with an account that has been previously established with the service provider. Each unique user identity is described in an account profile. Each account profile may be stored as a record in a database.

Use of profiles provides individualized or personalized features in an item rental system beyond queues of rental items. For instance, an account owner, such as a parent, can set up a different identity, distinguished by a unique username and password combination, for each member of the parent's household. Each profile is associated with a subordinate queue in a database of the item rental system. The parent can assign, to each profile, a maximum number of items that the person associated with an identity can obtain from the service provider at any one time. An item returned to an item rental service provider, and associated with a particular subordinate queue, is replaced by the next item in that queue. The account owner administers permissions and other characteristics of each profile and identity. The item rental service provider sends all rental items to the same postal address, and bills all transactions in the account to the same credit card. As another example of individualized or personalized features, personalized ratings and recommendations may be stored in association with a profile. Thus, each profile member rates rental items, the ratings are stored in a database in association with profile member identifying information, and the ratings are used to generate personalized rental item recommendations for each profile member without regard to the rental history of other profile members in the same account.

The preceding example has described the use of account profiles for multi-person households such as families with children. In an alternative embodiment, a single-person household can establish a plurality of profiles for an account, so that a single person can have plural separate queues of rental items. In another alternative, a two-person household that wants a shared queue with personalized recommendations or reviews can establish two profiles within a single account.

In one embodiment, each profile is associated in a database of an item rental service provider with a Queue of rental items, Ratings of rented items, a Rental History of previously rented items, and one or more personalized Recommendations of items that could be rented in the future. Thus, a person or identity associated with a profile can rate movies individually, receives item recommendations based upon their past ratings, is identified as a unique individual within an online user community, and can schedule or order the delivery of movies in that profile's Queue. In an embodiment, an account owner can delegate certain Account administration and Queue administration functions to a particular profile in the account.

In an embodiment applied in the context of renting audio-visual items such as movies and games, an account owner can set limits on the maturity level of movies that other identities can place in the queues of those identities. In another embodiment, each identity in an account receives age-appropriate online page presentations from the rental item service provider. For example, a server and appropriate software of the rental item service provider can determine that a current session involves a young child profile within an account and, in response, can present only web pages for G-rated movies that include larger buttons, cartoon-like artwork, simplified page layout, etc.

With the approach herein, persons associated with different profiles of an account may be resistant to any effort by the account owner to move away from the service provider to another service provider. Thus, the service provider in effect establishes a relationship with each identity of a profile. When persons associated with profiles interact in an online community product, each person can establish online relationships to particular friends, rather than establishing a relationship with a friend's households.

8.2 Features of an Example Profiles Approach

In one embodiment, a method of sharing an item rental account is implemented in an online item rental service that provides, through one or more appropriate networked servers and application programs, one or more of the following operational features for each profile identity:

1. Personalized rental item list, or queue, including functions to add and delete items from the Queue, view an item ship order, and view a rental history.
2. Personalized email notifications.
3. Storage of personalized favorite data values associated with rental items. For example, when rental items are movies, personalized favorite data values may include favorite actors, actresses, directors, genres, etc.
4. Personalized ratings and recommendations.
5. Personalized community relationships.
6. A maturity value or other constraint, managed by the account owner for all queues.
7. Personalized mailing labels for rental items that are delivered by mail.
8. Other account owner controls.
9. Allow profile members to receive shipments and receive system notices, newsletters, and select other communications.
10. Allow owners to remove a username/password combination, designating a Profile, from their Accounts.
11. Allow profile members to change a Profile into a stand-alone Account.
12. Enable an Account Owner to identify a Co-Owner who can participate in Account administration.

As described herein, a "User" or "Profile Member" is a subscriber to an item rental service who has unique authentication credentials into the service. Each User has a Profile.

An "Account" is a billing relationship established by a customer with the item rental service; in an embodiment, an Account has at least one and no more than five Profiles. Other embodiments may have any number of Profiles in an Account. An "Owner" is the User that establishes and manages the Account and is responsible for the billing relationship. A "Queue" is a personalized list of rental items that a User manages at the item rental service. A "Subordinate" refers to any User identity established by the Owner within an Account. Embodiments may be used with any kind of rental item. Embodiments in which rental items are movies may use any format for such movies, including DVD, electronic download, etc.

8.3 Structural Overview

Figure 8:
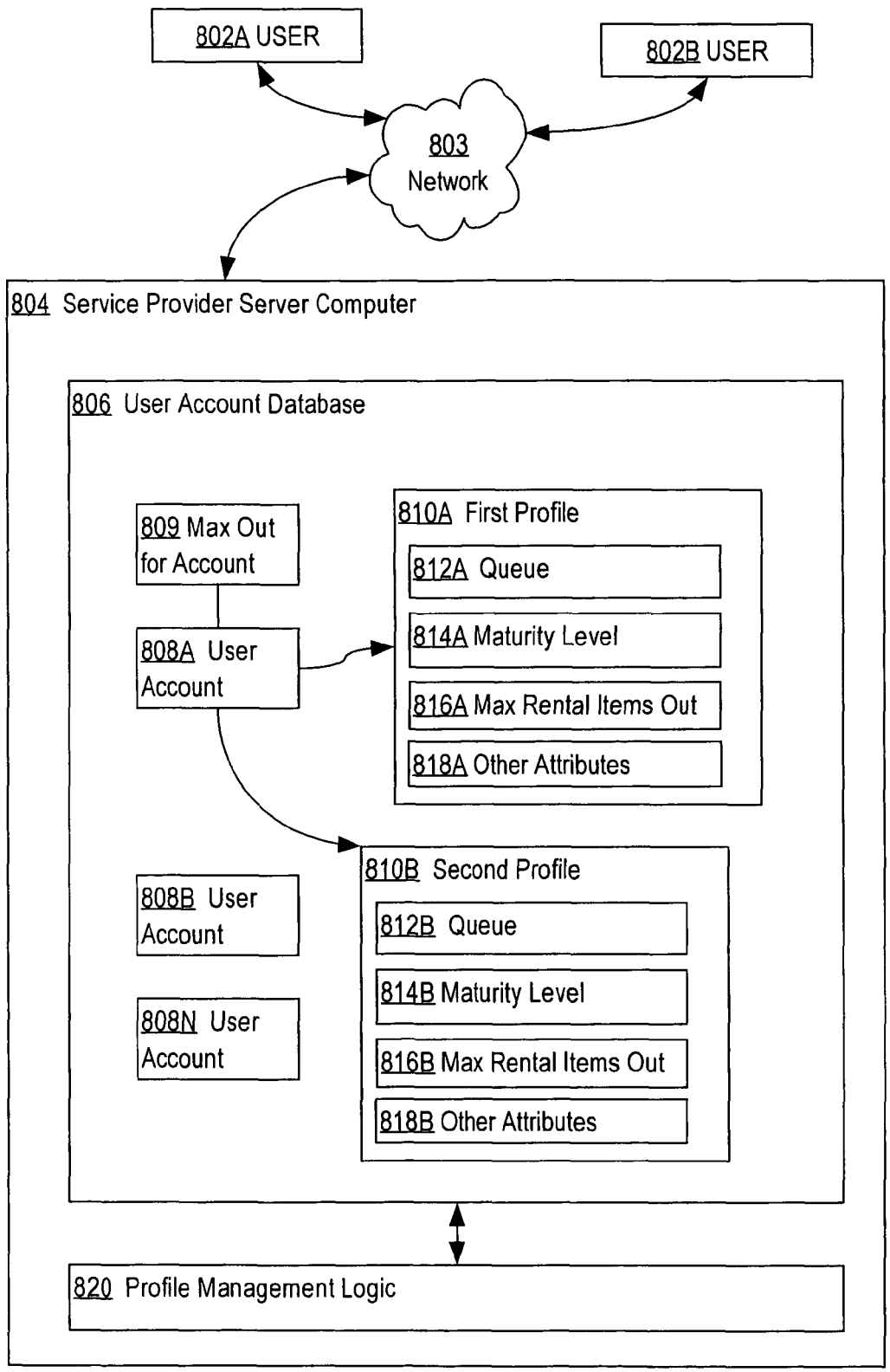
FIG. 8 is a block diagram of a server computer system that may be used to implement an example embodiment.

FIG. 8 is a block diagram of a server computer system that may be used to implement an example embodiment. One or more users 802A, 802B are coupled through a network 803 to a service provider server computer 804. In this context, users 802A, 802B broadly represent any end station device suitable for connecting through a network to the server computer 804 and performing the functions described herein, such as a personal computer, workstation, wireless device, etc. For purposes of illustrating a clear example, FIG. 8 shows two users; however, embodiments may serve any number of users.

Network 803 and links from users 802A, 802B to service provider computer 804 include, without limitation, a network such as a LAN, WAN or the Internet, a telecommunications link, a wire link, optical link or a wireless connection.

Server computer 804 includes a user account database 806 and profile management logic 820. User account database 806 comprises one or more user accounts 808A, 808B, 808N; any number of user accounts may exist in an embodiment. Each user account 808A, 808B, 808N is associated with one or more users, such as users 802A, 802B or others. For each user account 808A, 808B, 808N, one individual is designated as an account owner, and one or more other individuals are designated as profile members. A profile 810A, 810B is associated with each of the account owner and the other individuals, and one or more profiles are associated with an account. For example, a first profile 810A is associated with user 802A, who is an account owner, and a second profile 810B is associated with user 802B, who is a profile member of the same user account 808A. Profiles 810A, 810B are both associated with user account 808A, as indicated by arrows.

Generally, an account owner is responsible for payment to a service provider for rental item services, and controls attributes of all profiles associated with an account. In contrast, a profile member has a separate user identifier, item rental queue, and other attributes as described in sections 8.1 and 8.2 above, but is subject to limitations that the account owner sets, and is not responsible for payment.

User accounts 808B, 808N each have an account owner, and may have zero or any number of profile members. Each user account has a "max out" value 809 associated therewith, which indicates the maximum number of rental items that the account may receive at a time.

Each profile comprises a queue, a maturity level value, a value indicating the maximum number of rental items that an associated profile member is allowed to rent at a time ("max rental items out"), and one or more other attributes. For example, first profile 810A comprises a queue 812A, a maturity level value 814A, a max rental items out value 816A, and one or more other attributes 818A.

Queue 812A comprises an ordered list of rental items of the kind described above in section 1 through section 5. The maturity level value 814A indicates the highest item maturity level that a profile member is allowed to rent. In an embodiment in which rental items are movies, the maturity level value 814A may indicate the highest movie rating that a movie may have for a profile member to rent that movie. For example, maturity level value 814A may store an MPAA rating value such as G, PG, PG-13, R, NC-17, etc. If the maturity level value 814A is PG, then a profile member of first profile 810A may rent only G-rated or PG-rated movies; however, a profile member of second profile 810B may have a different maturity level value 814B that allows renting PG-13 or R movies. Alternatively, a profile can store ratings under the TV rating system (TV-MA, TV-15, etc.).

Maturity level values 814A, 814B are examples of constraints that a profile may store. In other embodiments, a profile stores a constraint other than a maturity level value. Thus, embodiments are not limited to the use of maturity level values as constraints on rental activity for profile members; any other appropriate, desired or useful constraint may be used. Examples of other constraints that may be used include rental item genre, rental item media format, rental item length, parental advisory warning values, video game rating values, etc.

The max rental items out value 816A specifies the largest number of rental items that the profile member of the first profile 810A may receive at a time. The max rental items out value 816A is some number equal to or less than the max out value 809 for the user account 808A of profile 810A. Further, the sum of the max rental items out value 816A of first profile 810A and the max rental items out value 816B of second profile 810B is equal to max out value 809. Thus, if user account 808A is allowed four (4) rental items out at a time, max out value 809 is "4" and max rental items out values 816A, 816B may be any combination of values that equals 4. The sum of values 816A, 816B could be less than max out value 809, but such a configuration would represent less than optimal usage of the user account 808A.

The other attributes 818A, 818B may store any other profile values that are found useful or convenient, such as the age of a person associated with a profile, a shipping address for a person associated with a profile, a date on which the profile was created, a flag indicating whether a person associated with a profile is participating in online community features, etc.

Other attributes 818A, 818B may indicate that a profile is associated with one of a plurality of alternative means of delivery. For example, if a rental service contemplated fulfillment of audiovisual items via either physical delivery or electronic delivery to one or more TV set-top boxes or other customer premises equipment, information in profiles can designate target set-top boxes for specific movies. As a specific example, assume a household owns two TV set-top boxes one in the living room for the parents' use and one in the kids' room for kids' use. The parents might associate the parents' set-top box with the parents'-specific profile and queue, and the kids' set-top box with the kids' profile and queue. Any movies in the parents' queue would be fulfilled either by DVD in a physical mailer addressed to the parents, or by electronic delivery to the parents' set-top box, while any movies in the kids' queue would be delivered either by DVD in a physical mailer addressed the kids, or by electronic delivery to the kids' set-top box. Values of other attributes 818A, 818B may designate the particular mechanism for delivery.

Various other ways to combine binding of set-top boxes and profile queues are contemplated. For example, in various embodiments specific queues are designated for delivery by DVD only, or delivery to the set-top box only. In another embodiment, rules in a profile can designate that particular available queue entries of profiles are designated as electronic delivery only between other profiles associated with specific users rather than to specific hardware devices.

In one embodiment, user accounts, profiles, and the data structures and values within profiles are implemented using tables and relationships in a relational database system, such as Oracle, Microsoft SQL Server, etc.

Profile management logic 820 comprises one or more computer programs, other software elements, or processes that implement the functions that are described further herein.

8.4 Functional Overview

Figure 9A:
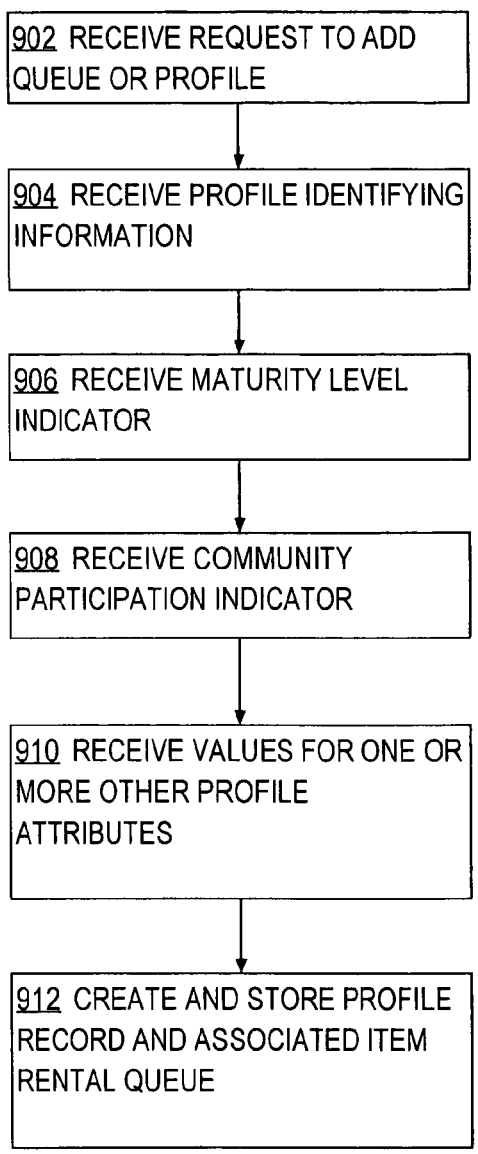
FIG. 9A is a flow diagram depicting an overview of a method of sharing an item rental account.

FIG. 9A is a flow diagram depicting an overview of a method of sharing an item rental account. In step 902, a request is received to add a queue or profile to an item rental account. In one embodiment, a user interface of an online item rental system provides an "Add Queue" option which, when selected by an owner or user of an item rental account, communicates a request to add a further queue to the account. Alternatively, a functionally equivalent user interface option may be termed an "Add Profile" option.

In step 904, profile identifying information is received. Step 904 may involve receiving data specifying a name for a profile, a sign-in name, a password, a shipping address, or any other suitable combination of values that uniquely identities a profile.

In step 906, a maturity level indicator is received. Step 906 may involve receiving user input for a value for maturity level value 814A as described above in connection with FIG. 8. In embodiments for rental items for which a maturity level indicator is not needed, step 906 may involve receiving user input for a constraint other than maturity level, or step 906 may be omitted.

In step 908, a community participation indicator is received. Step 908 may involve receiving user input that indicates whether to allow the associated profile member to participate in online community features of the item rental system. Examples of online community features include sharing queue contents, notifying other account owners or profile members of item rental activity, instant messaging, writing reviews, communicating with friends, etc. In an embodiment, the community participation indicator is "disabled" for subordinates by default, but "enabled" for the Account Owner.

In step 910, values for one or more other profile attributes are received. Other attributes may include the age of a person associated with a profile, a date on which the profile was created, etc. Such other attributes may be received through user input or may be generated by the item rental system for an account profile record. The values received in steps 904-910 all may be received in a single user interface display screen, or the method may involve displaying a user interface dialog or a succession of screens in which the data is collected.

In step 912, a profile record and associated item rental queue are created and stored in a database of the item rental system. The profile record may have the values shown in FIG. 8.

Figure 9B:
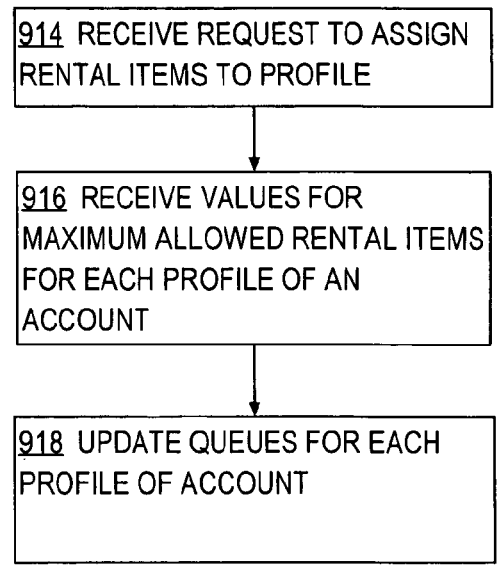
FIG. 9B is a flow diagram of a process of assigning a maximum allowed number of rental items to a profile.

FIG. 9B is a flow diagram of a process of assigning a maximum allowed number of rental items to a profile. Using the process of FIG. 9B, an account owner can specify how many rental items the item rental service should send at a time to the profile member for a newly created profile. In one embodiment, after performing step 912 of FIG. 9A, the item rental system automatically generates and displays a user interface screen that indicates the maximum number of items that the account may have out at a time, and that prompts the user to enter the maximum number of items that each profile may have out at a time.

Alternatively, at any time a user may provide user input requesting to enter such values. In such an embodiment, in step 914 a request to assign rental items to a profile is received.

In step 916, values are received for the maximum allowed rental items for each profile of an account. For example, if an account has two profiles, then step 916 involves receiving a number of maximum allowed rental items for each of the two profiles, verifying that the sum of the two numbers does not exceed the maximum number of items that the associated account may receive at a time, and storing the two values in the database.

In step 918, queues for each profile of the account are updated. Step 918 may involve computing, updating or displaying queue information such as the number of rental items that are available to use before a next subscription period ends, information indicating what rental items are scheduled for shipment, etc. Step 918 generally represents updating any information relating to an item queue or item queue functions that may require changes as a result of a change in the values received at step 916.

FIG. 9C is a flow diagram of processing a request to add a rental item to a profile member queue. In step 920, login information for a profile member is received. The login information may comprise, for example, the sign-in name and password that the account owner supplied at step 904 of FIG. 9A. Step 920 represents receiving and validating or authenticating the login information to verify that the login information identifies a valid, active profile.

In step 922, a request is received to add a rental item to a queue for the profile member. For example, the profile member browses an online catalog of available rental items, selects a desired rental item, and selects a user interface widget that requests adding the selected rental item to the queue of the profile member.

In response, at step 924, the item rental system determines whether a maturity rating for the selected rental item is greater than the allowed maturity level for the profile. In other embodiments for which maturity level values are not associated with rental items, step 924 may involve performing other tests or checks to determine whether the item rental system can rent the selected rental item to the profile member based on a stored constraint other than maturity level. Thus, a test specifically based on maturity level is not required at step 924, and step 924 broadly represents testing for any configured constraint that applies to the rental item that the profile member has selected.

If the maturity rating for the selected rental item is not greater than the allowed maturity level for the profile, then in step 928 the rental item is added to the queue for the profile member. In step 934, the queue is displayed so that the profile member can verify the addition and see the complete contents of the queue. Thereafter the rental item is provided to the profile member in the manner described above in sections 1-5.

If the maturity rating for the selected rental item is greater than the allowed maturity level for the profile, then in step 926 the profile member is prompted to provide a password of the account owner. Thus, to rent an item having a disallowed maturity rating, the profile member must override the allowed maturity level by providing the account owner's password as proof that the account owner approves of the item rental transaction at the requested maturity level. If the account owner's password is correct, as tested at step 930, then control passes to step 928 as described above.

If the account owner's password is incorrect, then in step 932 an error message is presented. In that case, the profile member is required to either provide a valid account owner password at step 926, or the profile member can abandon the transaction and not rent the item.

Figure 10A:
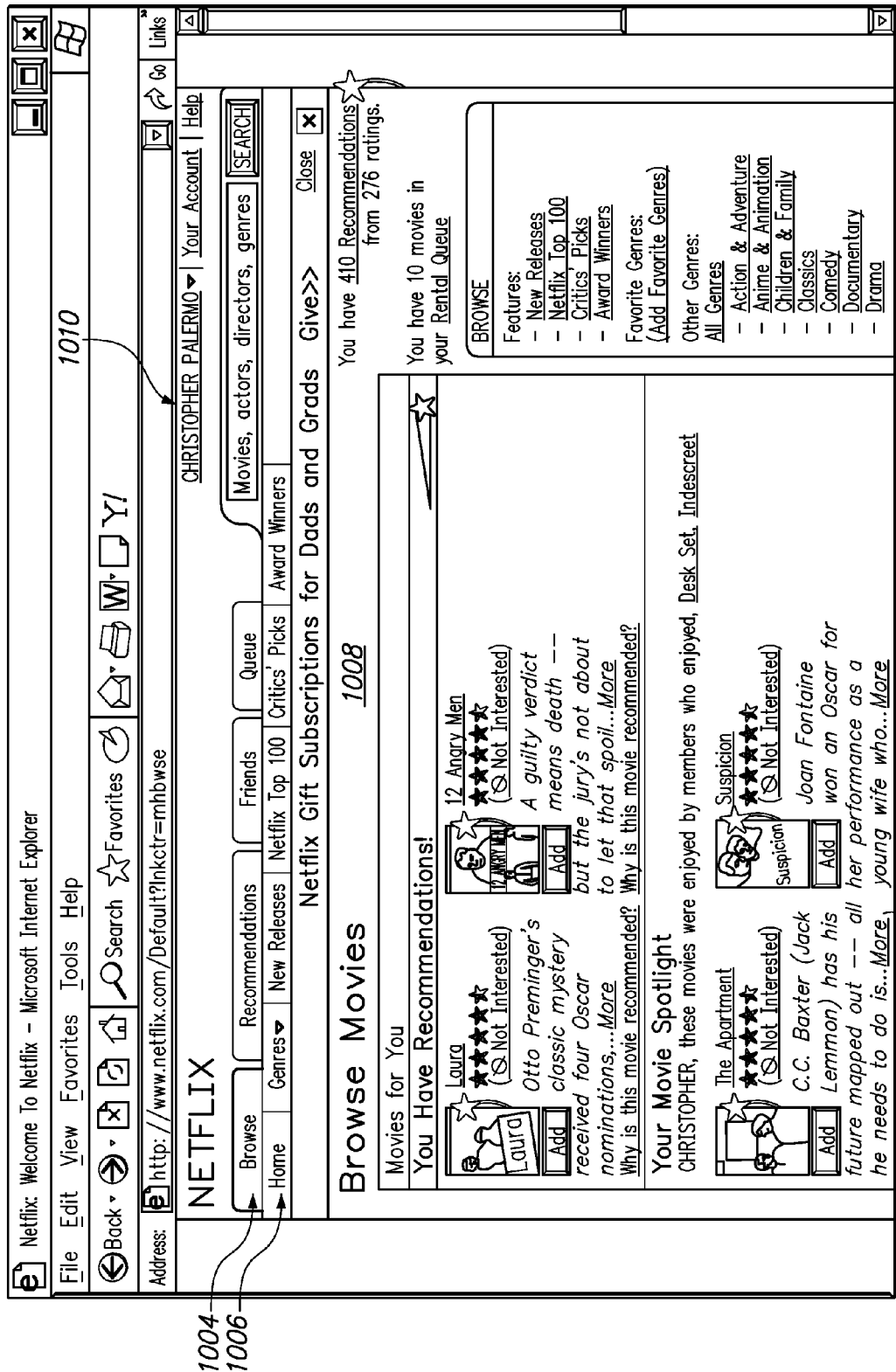
FIG. 10A is a screen display diagram showing an example user interface display relating to browsing rental items.
Figure 10B:
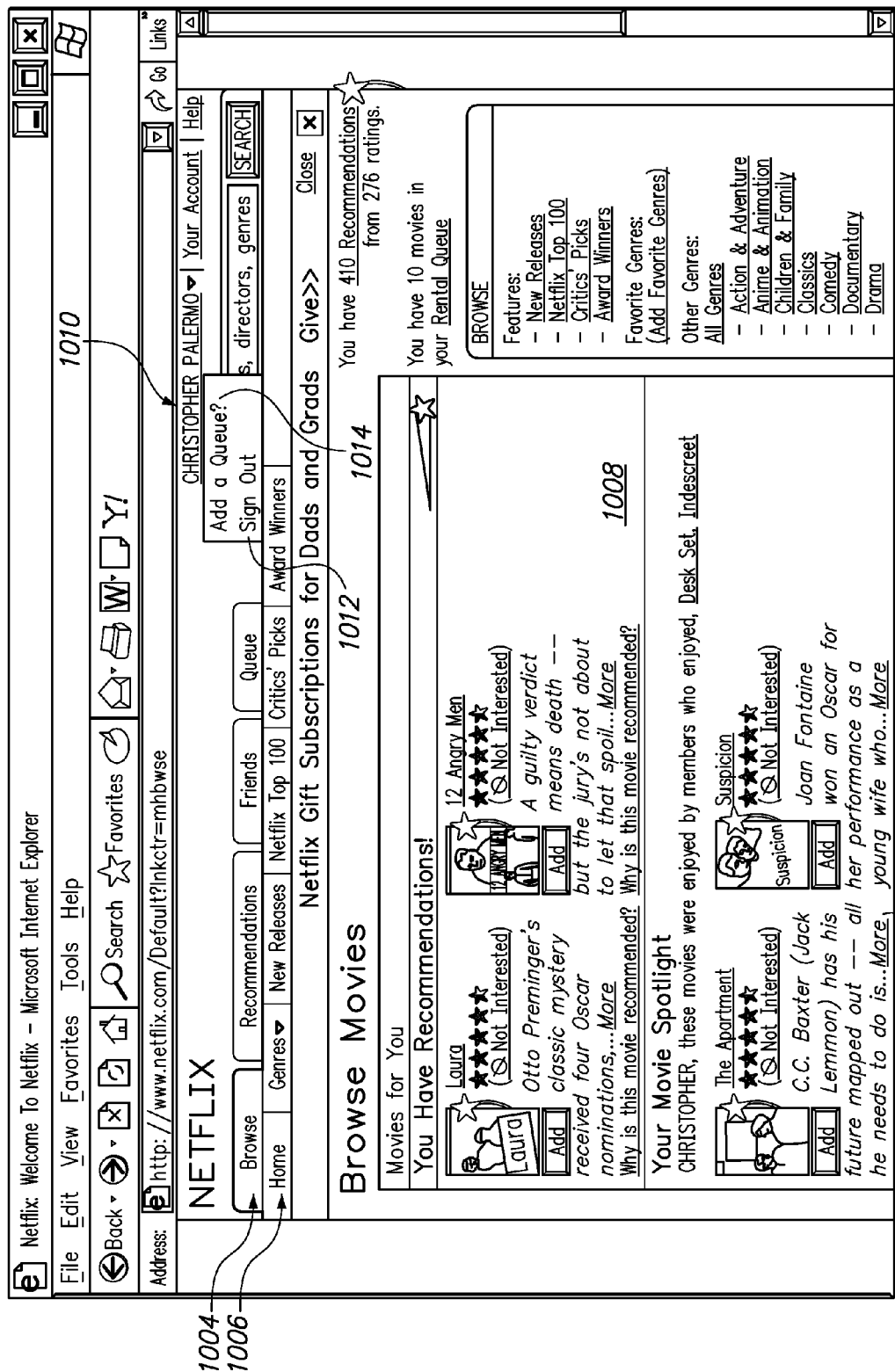
FIG. 10B is a screen display diagram showing an example user interface display relating to adding a queue or profile to an account.
Figure 10C:
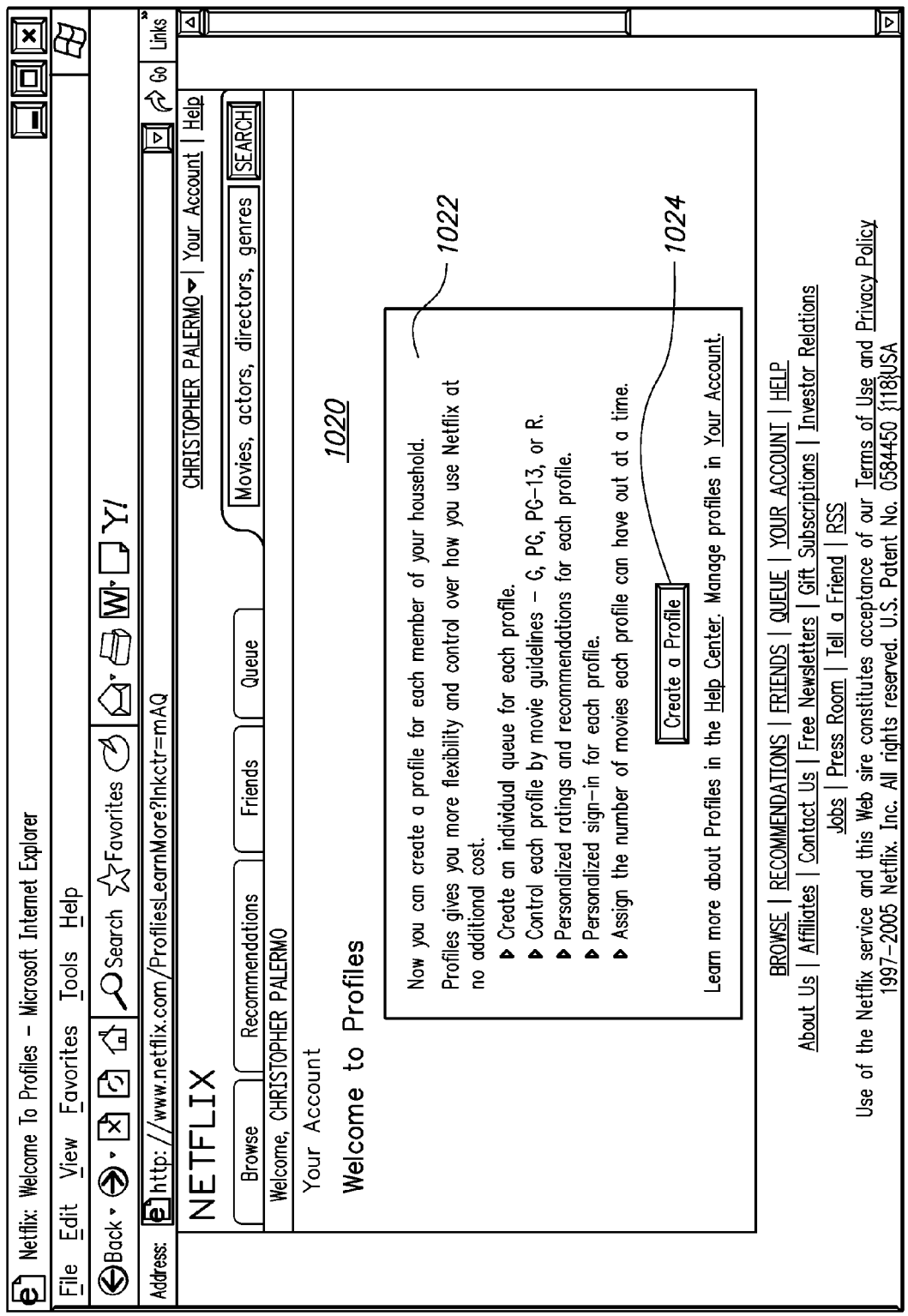
FIG. 10C is a screen display diagram showing an example profile introduction.
Figure 10D:
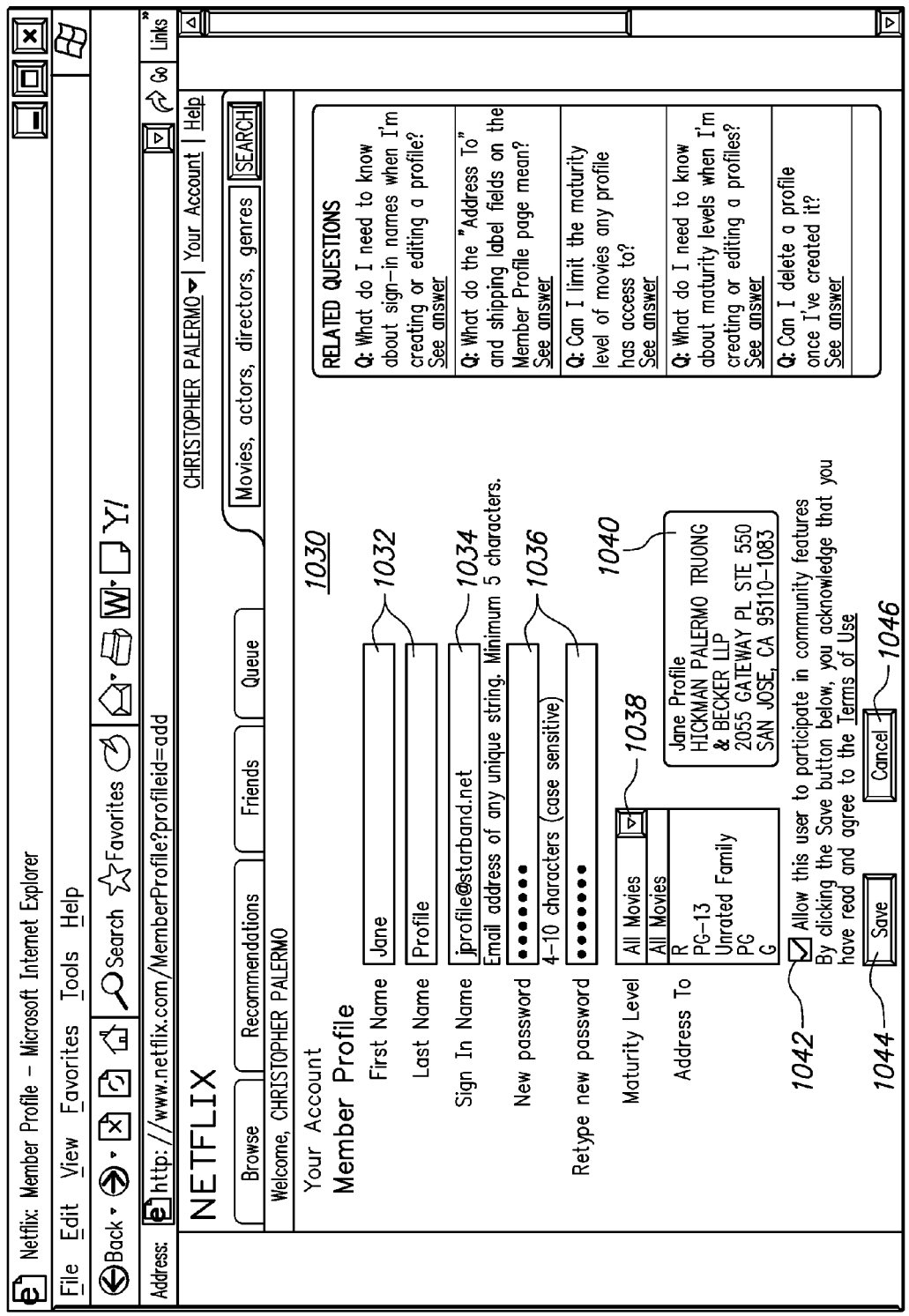
FIG. 10D is a screen display diagram showing an example user interface display relating to entering attributes of a profile.
Figure 10E:
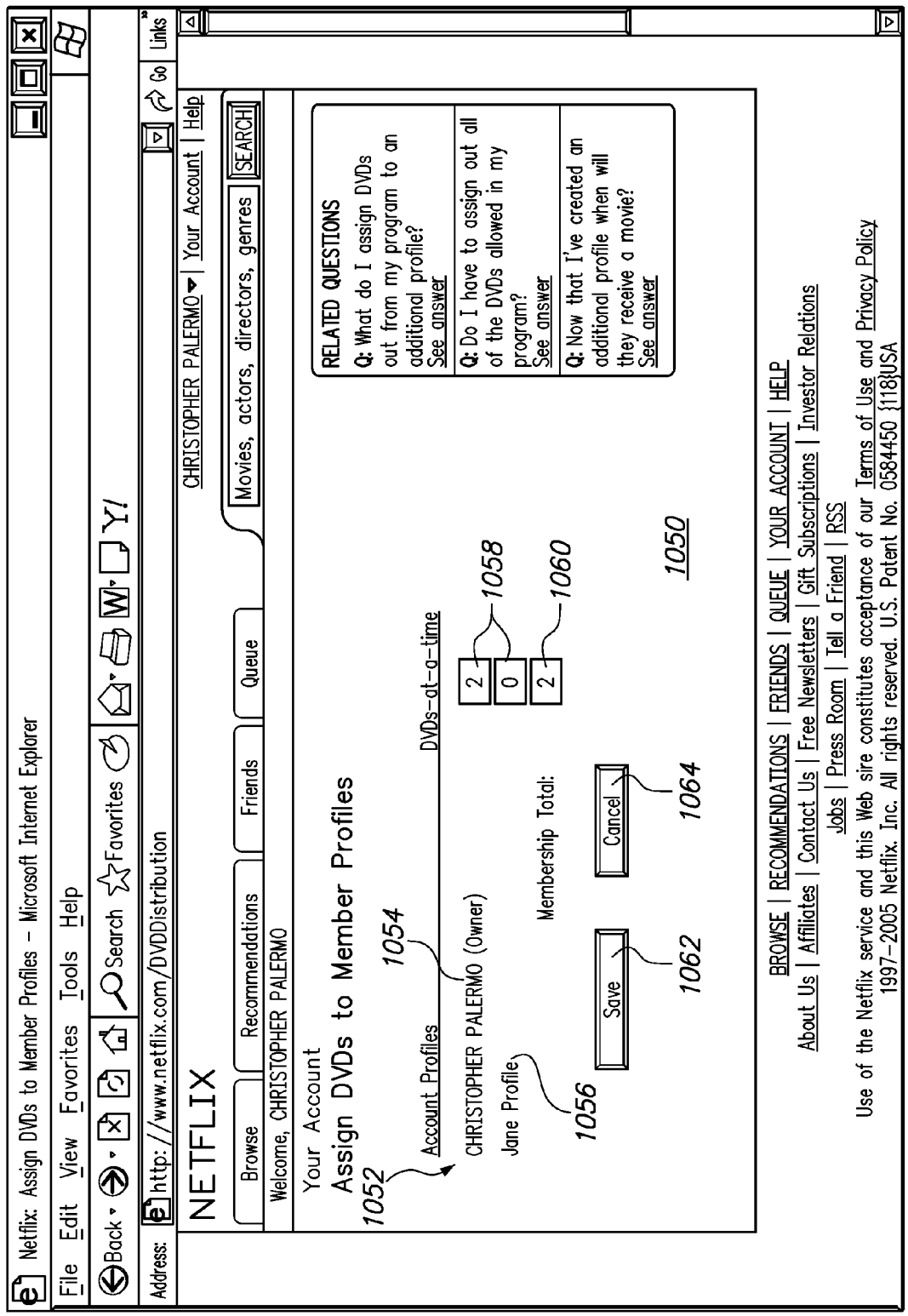
FIG. 10E is a screen display diagram showing an example user interface display relating to browsing rental items.

The broad approach of FIG. 8 and FIG. 9A-9C is now illustrated in the context of one example user interface that may be used to implement an embodiment. Other embodiments of the approach herein may use any other form of user interface that is desired or appropriate. FIG. 10A is a screen display diagram showing an example user interface display relating to browsing rental items. FIG. 10B is a screen display diagram showing an example user interface display relating to adding a queue or profile to an account. FIG. 10C is a screen display diagram showing an example profile introduction. FIG. 10D is a screen display diagram showing an example user interface display relating to entering attributes of a profile. FIG. 10E is a screen display diagram showing an example user interface display relating to browsing rental items.

Referring first to FIG. 10A, in one embodiment a graphical user interface (GUI) 1000 of a conventional browser program, such as Microsoft Internet Explorer, Mozilla Firefox, Netscape Navigator, etc., displays a first page 1002 for the Netflix® item rental service that is commercially offered by Netflix, Inc., Los Gatos, Calif. Page 1002 comprises a plurality of page selection tabs 1004 which, when selected by user input such as a mouse click, causes a server of the item rental service to generate and transmit to the browser page content 1008 associated with the selected tab. In one embodiment, tabs respectively entitled Browse, Recommendations, Friends, and Queue enable a user to browse rental items such as movies, display recommendations for rental items that are automatically generated by the item rental service, review rental activity of friends who also use the service, and display the user's item rental queue. Each tab 1004 may have one or more associated sub-functions that are represented by hyperlinks 1006.

A profile combo box 1010 specifies a name of the currently active profile member. If a user account has a plurality of profiles associated with the account, selecting profile combo box 1010 causes the browser to display a list of the profiles, enabling user selection of different profiles. In an embodiment, profile combo box 1010 functions using Javascript code that is delivered to the browser with page 1002.

Referring now to FIG. 10B, when an account has only one associated profile for the account owner, selecting profile combo box 1010 causes the browser to display two links entitled "Add a Queue?" and "Sign Out." If other profiles are associated with the account, then the names of such profiles are also displayed. For purposes of illustrating a clear example, the following description assumes that an account had one profile and the account owner wishes to add a second profile and allocate rental items to the new profile. Therefore, for purposes of the example, assume that the "Add a Queue?" link is selected in profile combo box 1010 of FIG. 10B.

Referring now to FIG. 10C, in one embodiment, in response to selecting the "Add a Queue?" link a welcome page 1020 is displayed. Welcome page 1020 may comprise a panel 1022 providing information about how profiles function and a confirmation button 1024. Selecting the confirmation button 1024 enables the account owner to confirm that the account owner wishes to create a profile that will function as stated in panel 1022. Use of a welcome page 1020 is optional in an embodiment and may be omitted. However, the user of a welcome page 1020 may improve performance of an item rental system by preventing the needless creation of profile records by account owners who select "Add a Queue?" without fully understanding how profiles function.

Referring now to FIG. 10D, in response either to selection of the "Add a Queue?" link or the confirmation button 1024, the item rental service generates and transmits to the browser a member profile page 1030 comprising data entry fields that define a profile member and the capabilities of the profile member. In one embodiment, member profile page 1030 comprises name fields 1032, a sign-in name field 1034, password fields 1036, maturity level combo box 1038, an address display 1040, a community check box 1042, a save button 1044, and a cancel button 1046.

The name fields 1032 receive a name of a new profile member. The sign-in name field 1034 receives a name that the profile member will use to sign in to the profile, such as an email address or handle. The password fields 1036 receive a password that the profile member will use to obtain secure access to the profile and may include a password confirmation field to ensure that an entered password is accurate.

The account owner may specify a maximum maturity level allowed for the profile member using maturity level combo box 1038. In other embodiments, a user interface widget other than a combo box may be used. In other embodiments, a constraint other than maturity level may be entered.

The address display 1040 indicates the shipping address to which rental items for the profile member will be sent. In one embodiment, address display 1040 is a data entry field, and the account owner may specify an alternate delivery address for the profile member. The account owner may specify whether the profile member can participate in online community features by selecting a community check box 1042.

The account owner may select the save button 1044 to cause the item rental service to verify the entered data values and save the entered values in the database of the item rental service. The account owner may select the cancel button 1046 to discontinue entering a profile record.

If all the foregoing values are entered and the account owner selects the save button 1044, then in response, the item rental service generates and sends to the browser a page requesting entry of the maximum number of items that the profile member may receive at a time. Referring now to FIG. 10E, in one embodiment, an assignment page 1050 is displayed comprising a table 1052 that lists the profile names 1054, 1056 of each profile of the current account and comprises data entry fields 1058 for specifying the maximum number of items that each profile member is allowed to receive.

The account owner may modify values in fields 1058 using the keyboard or other user input and may save the entered values using a save button 1062. In an embodiment, the sum of values in fields 1058 must be less than or equal to a maximum number of rental items allowed for the account, as indicated by a Membership Total value 1060. Therefore, in one embodiment, selecting save button 1062 causes Javascript code in the browser to verify that the sum of the fields is less than the allowed maximum. If not, then the account owner is prompted using a Javascript error message to correct the entered values. The account owner may save the revised values, or discontinue entering a profile record by selecting the cancel button 1064.

Assuming the entered values are correct and are saved, in response, creation of a new profile is complete, and the item rental service generates and sends to the browser a queue display page for the newly created profile. The account owner or the profile member then may add rental items to the queue.

Figure 10F:
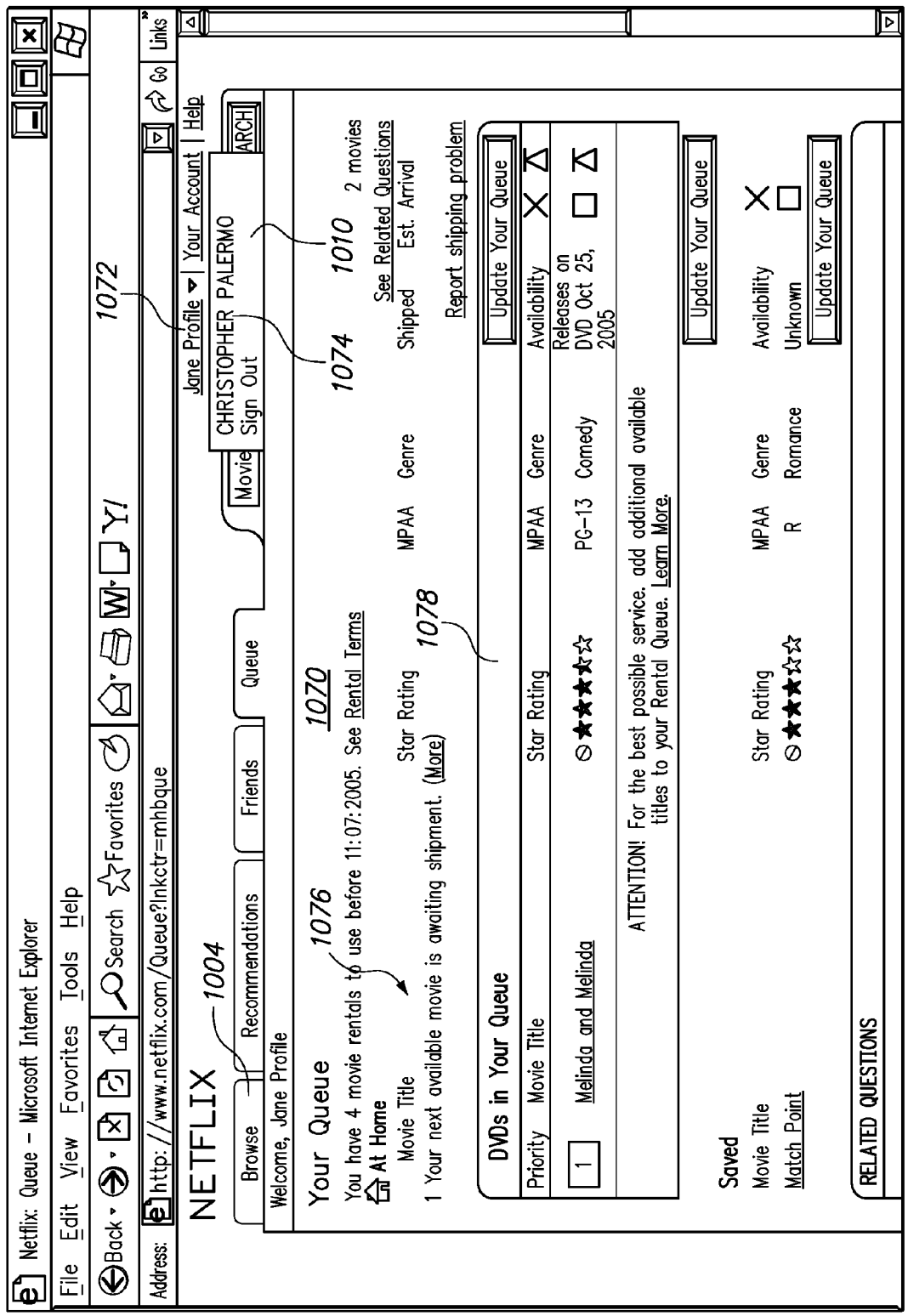
FIG. 10F is a screen display diagram showing a queue page.

Referring now to FIG. 10F, in one embodiment a queue page 1070 may include a first list 1076 of rental items that the profile member has already received and a second list 1078 of rental items that are in the queue but not yet provided to or received by the profile member. In the example of FIG. 10F, the profile member named "Jane Profile" has not received any rental items, and has one rental item ("Melinda and Melinda") in queue.

Profile combo box 1010 displays the name of the current profile member ("Jane Profile") by default. When the profile combo box 1010 is selected, the profile combo box displays the current profile member name 1072, the account owner's name 1074, and a sign out link.

To add other rental items to the queue, the profile member may select the Browse link 1004 to browse rental items, or may use a search box to enter the name of a particular rental item or other information about a specified rental item. In an embodiment, a profile member is allowed to add a rental item to the profile member's queue only if the maturity level value associated with that rental item is less than or equal to the maturity level value specified in the profile.

As an example, assume that rental items are movies, and that the maturity level in the profile for profile member "Jane Profile" is PG-13. If Jane Profile attempts to rent a movie having a maturity level higher than PG-13, the item rental service requires confirmation by the account owner as a condition of allowing the rental. For example, assume that Jane Profile browses movies available for rental, selects "The Talented Mr. Ripley," which is rated R, and selects an Add button to add that movie to Jane Profile's queue. In response, the item rental service generates and sends to the browser a confirmation page.

Figure 10G:
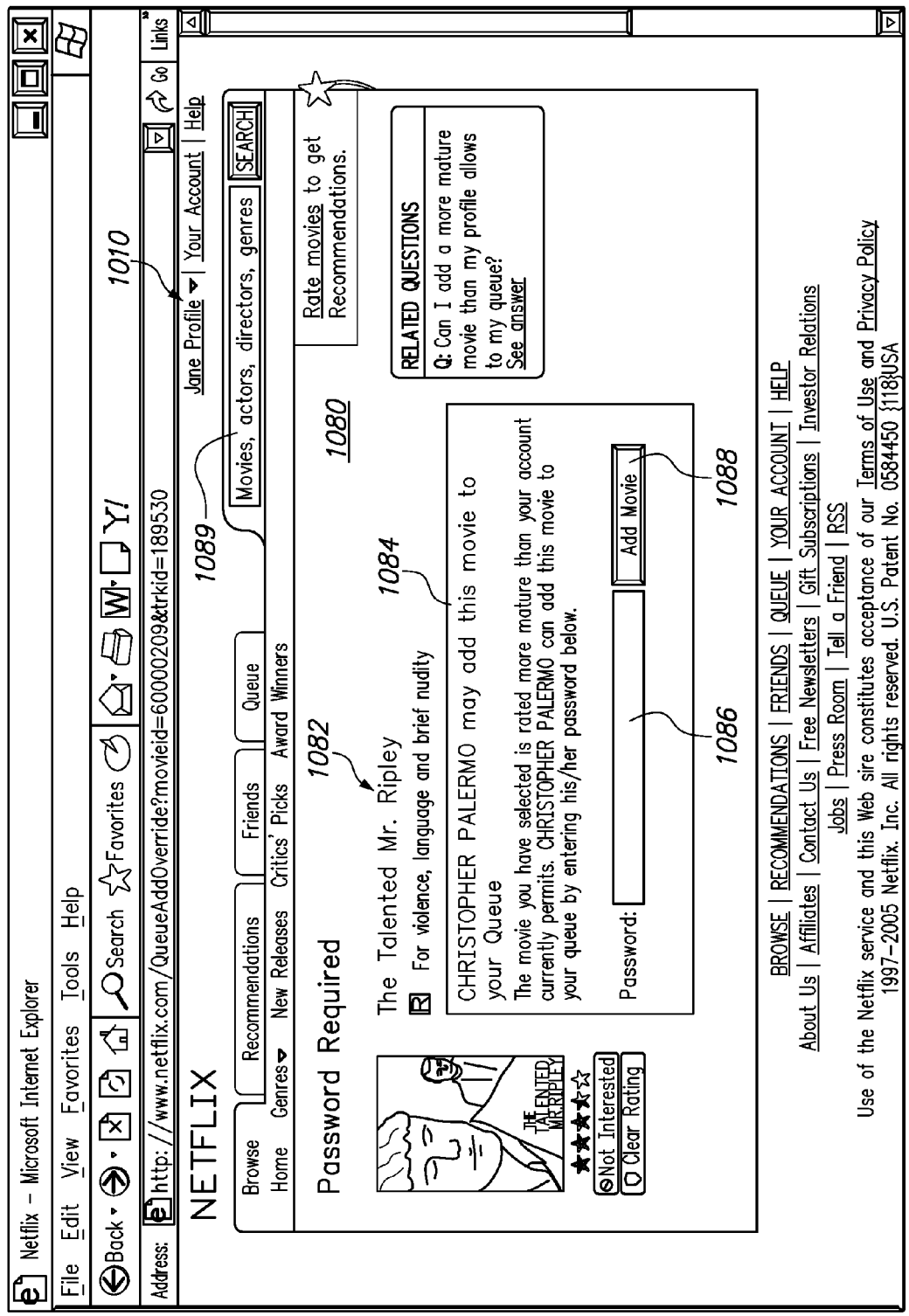
FIG. 10G is a screen display diagram showing a confirmation page.

Referring now to FIG. 10G, in one embodiment, a confirmation page 1080 comprises item rental information 1082, an information panel 1084, a password field 1086, and an Add Movie button 1088. Rental information 1082 provides brief information about the selected rental item, so that the account owner can see what the profile member wishes to rent. Information panel 1084 comprises text explaining to the profile member that account owner approval is required for the rental item because its maturity level exceeds the maturity level configured for the profile.

If the proposed rental transaction is acceptable, then the account owner enters the account owner's password in the password field 1086 and selects the Add Movie button 1088. In response, the item rental service validates the entered password. If the password is valid, then the item rental service adds the selected rental item to the profile member's queue and re-displays the queue, as in FIG. 10F. If the password is invalid, then the item rental service re-generates the confirmation page 1080 and includes a message indicating that the password was invalid. The profile member can abandon the transaction by selecting the Browse, Recommendations, Friends, or Queue tabs, or by entering information in search box 1089.

In an alternative embodiment, rather than displaying the information presented in confirmation page 1080 directly to the Profile Member, the item rental service may send an email message to the Account Owner to request approval for the proposed rental. The email message contains a hyperlink which, when selected by the Account Owner, causes a browser at the Account Owner's location to display confirmation page 1080. This approach is useful to facilitate remote approval of a rental item, that is, when the Account Owner and the Profile Member are in separate locations and the Profile Member wishes to obtain remote approval to rent an item.

8.5 Additional Features and Functions

Other user interface displays and processes may implement the functions described above in section 8.1 and section 8.2. Further, various embodiments may implement any one or more of the following features and functions.

In one embodiment, if an Owner elects to downgrade to a rental service subscription plan that does not support the number of rental items assigned to the Owner's current number of Profile Queues, at the end of the next billing period (that is, when the downgrade takes effect), the item rental service sets all non-Owner Queues to "0" and the owner must reallocate items to Profiles. When the downgrade occurs, an Owner receives an email notifying the Owner that all rental items have been reassigned to the Owner and Owner must reassign rental items to Profiles in the Account.

In an embodiment, if the Owner upgrades his or her subscription with the item rental service, the item rental service receives a Program Change page that explains the rental items have been added to the Owner's Queue and that the Owner should immediately allocate those rental items using the process of FIG. 1E. If the upgrade is "deferred" because a customer has already taken advantage of an immediate upgrade, the Program Change page specifies that rental items will be added in the future when the change takes effect and the Owner should allocate the rental items at that time.

In an embodiment, an Owner can view a full rental history for all Profiles in the Account. This approach enables the Owner to report problems for any items received in their Account. In an embodiment, the Owner can display either the Owner's rental history or an aggregate account rental history.

In one embodiment, multiple Users of Profiles in the same Account may have the same rental item in their Queue. If any User adds a rental item to the User's Queue that already exists in one or more of the other Queues in the Account (or is currently "out" to the household associated with the Account), the item rental service generates and sends a page to the User advising that the rental item resides in another User's Queue for the same household or has been shipped. In an embodiment, the page indicates which Queue and what position the item is in. However, the User is allowed to place the movie in their Queue.

In an embodiment, an Owner can place rental items into a Subordinate Queue, even if the Subordinate is restricted to a particular maturity level or restricted by another constraint. The rental items the Owner can place into a Subordinate Queue are not bound by the constraint of the Subordinate's Profile (e.g., An Owner can place an "R" movie into a PG-13 Queue.)

In an embodiment, the item rental service provides a Switch Profile with which an Owner can quickly work with the Queue and Profile information of another User without entering a password. In this embodiment, by allowing the owner to quickly become another user and by implementing the constraint override function described above, the item rental service allows the Owner to become another User, find a rental item using either search or browsing, add the selected rental item to the subordinate's Queue, position the rental item in the queue, and then log out of the subordinate account and return to the User's own Profile.

In an embodiment, an Owner can enable or disable restrictions on Subordinate users that define the types of email that the item rental service sends to the Subordinates. In one embodiment, restrictions can individually control each of the following: ship/receive notifications; newsletters; movie suggestions; critics' reviews; account hold notices; and special offers.

In an embodiment, a co-Owner may be designated. To reduce the administration burden on the Owner, the Owner can designate one or more of the subordinate users in the Account as Co-Owner with full administration rights. For example, a family of 4 might have an Account where "mom" signs up using her credit card and email address (and is the Owner). "Mom" then creates three additional Users ("dad", "teen", and "kid") and designates "dad" as Co-Owner. "Dad" would have all the same administration rights as "mom".

In an embodiment, Owners can "remove" a profile from an Account, and only Owners can do so. Removing a profile, in one embodiment, does not delete the profile but merely removes an association between the profile and the account. In an embodiment, when the Owner removes an profile from the Account, all existing identity, queue, ratings, recommendations, and rental history for the removed profile remains intact in the database in records for the removed profile.

If a Profile Member associated with a removed Profile attempts to log into the item rental service, the Profile Member is required to complete a sign-up process before receiving access to the Profile. This approach reduces the possibility that Profile Members associated with removed Profiles that had constraints would be able to perform actions (e.g., view previews, etc.) that were prohibited when the Profile was active.

In one embodiment, upon removal of a Profile, the Account Owner can request the item rental service to send an email to the newly removed Profile Member alerting the Profile Member to their new status, with instructions on how to reactivate the profile as a new account.

In one embodiment, a Spin-Off feature enables subordinate users not subject to maturity restrictions or other constraints to "spin off" their profile out of an existing account and establish it as a new account. Any profile that is restricted by a constraint cannot be spun out; the Account Owner must first remove the constraint. This approach helps eliminate the risk that a child Profile Member could attempt to make the child's Profile "private" without parental knowledge.

In an embodiment, when a profile user spins out, all existing identity, queue, ratings, recommendations, and rental history (for that profile) remain intact with that profile in the database, but the Profile is disassociated from the Account. If a Profile Member associated with a spun-off Profile attempts to log into the item rental service, the Profile Member is required to complete a sign-up process before receiving access to the Profile.

In the foregoing specification, the invention has been described with reference to specific embodiments thereof. However, various modifications and changes may be made thereto without departing from the broader spirit and scope of the invention. The specification and drawings are, accordingly, to be regarded in an illustrative sense rather than a restrictive sense.

What is claimed is:

1. A method for sharing an item rental account, the method comprising the computer implemented steps of:
   establishing a user account comprising a first queue and a second queue;
   associating the second queue with a constraint value, wherein the constraint value specifies a constraint on rental items that a profile member associated with the second ordered queue is allowed to rent;
   receiving a request to add a specified rental item to the second queue, wherein the specified rental item does not conform to the constraint value; and
   adding the specified rental item to the second queue in response to receiving confirmation from an account owner of the user account;
   wherein the method is performed by one or more computing devices.

2. A method as recited in claim 1, wherein the user account is associated with a total maximum number of allowed rental items, wherein the first queue is associated with a first maximum number of allowed rental items for the first queue, wherein the second queue is associated with a second maximum number of allowed rental items for the second queue.

3. A method as recited in claim 2, wherein user input is received for the first maximum number and the second maximum number, and wherein the first maximum number and the second maximum number are associated with the first queue and the second queue only when a sum of the first maximum number and the second maximum number is less than the total first maximum number of allowed rental items.

4. A method as recited in claim 1, wherein in response to receiving the request to add the specified rental item to the second queue, the profile member is prompted to provide a password of the account owner, and wherein the specified rental item is added to the second queue only in response to successful validation of the password of the account owner.

5. A method as recited in claim 1, wherein the rental items are movies, and wherein the constraint value specifies a maturity level of a movie.

6. A method as recited in claim 1, wherein the rental items are audiovisual programs, and wherein the constraint value specifies any of an MPAA rating of an audiovisual program and a TV rating of the audiovisual program.

7. A method as recited in claim 1, wherein the rental items are games, and wherein the constraint value specifies a game rating.

8. A computer system for renting items, comprising:
   a computer that is coupled to a digital telecommunications network by a digital telecommunications link;
   an electronic digital memory in the computer;
   one or more sequences of computer program instructions stored in the electronic digital memory, the instructions causing the computer to perform the following steps when executed:
   establishing a user account comprising a first queue and a second queue;
   associating the second queue with a constraint value, wherein the constraint value specifies a constraint on rental items that a profile member associated with the second ordered queue is allowed to rent;
   receiving a request to add a specified rental item to the second queue, wherein the specified rental item does not conform to the constraint value; and
   adding the specified rental item to the second queue in response to receiving confirmation from an account owner of the user account.

9. A computer system as recited in claim 8, wherein the user account is associated with a total maximum number of allowed rental items, wherein the first queue is associated with a first maximum number of allowed rental items for the first queue, wherein the second queue is associated with a second maximum number of allowed rental items for the second queue.

10. A computer system as recited in claim 9, wherein user input is received for the first maximum number and the second maximum number, and wherein the first maximum number and the second maximum number are associated with the first queue and the second queue only when a sum of the first maximum number and the second maximum number is less than the total first maximum number of allowed rental items.

11. A computer system as recited in claim 8, wherein in response to receiving the request to add the specified rental item to the second queue, the profile member is prompted to provide a password of the account owner, and wherein the specified rental item is added to the second queue only in response to successful validation of the password of the account owner.

12. A computer system as recited in claim 8, wherein the rental items are movies, and wherein the constraint value specifies a maturity level of a movie.

13. A computer system as recited in claim 8, wherein the rental items are audiovisual programs, and wherein the constraint value specifies any of an MPAA rating of an audiovisual program and a TV rating of the audiovisual program.

14. A computer system as recited in claim 8, wherein the rental items are games, and wherein the constraint value specifies a game rating.

15. A computer-readable storage medium storing one or more sequences of computer program instructions, the instructions causing one or more computing devices to perform the following steps when executed:

establishing a user account comprising a first queue and a second queue;

associating the second queue with a constraint value, wherein the constraint value specifies a constraint on rental items that a profile member associated with the second ordered queue is allowed to rent;

receiving a request to add a specified rental item to the second queue, wherein the specified rental item does not conform to the constraint value; and adding the specified rental item to the second queue in response to receiving confirmation from an account owner of the user account.

16. A computer-readable storage medium as recited in claim 15, wherein the user account is associated with a total maximum number of allowed rental items, wherein the first queue is associated with a first maximum number of allowed rental items for the first queue, wherein the second queue is associated with a second maximum number of allowed rental items for the second queue.

17. A computer-readable storage medium as recited in claim 16, wherein user input is received for the first maximum number and the second maximum number, and wherein the first maximum number and the second maximum number are associated with the first queue and the second queue only when a sum of the first maximum number and the second maximum number is less than the total first maximum number of allowed rental items.

18. A computer-readable storage medium as recited in claim 15, wherein in response to receiving the request to add the specified rental item to the second queue, the profile member is prompted to provide a password of the account owner, and wherein the specified rental item is added to the second queue only in response to successful validation of the password of the account owner.

19. A computer-readable storage medium as recited in claim 15, wherein the rental items are movies, and wherein the constraint value specifies a maturity level of a movie.

20. A computer-readable storage medium as recited in claim 15, wherein the rental items are audiovisual programs, and wherein the constraint value specifies any of an MPAA rating of an audiovisual program and a TV rating of the audiovisual program.

21. A computer-readable storage medium as recited in claim 15, wherein the rental items are games, and wherein the constraint value specifies a game rating.

* * * * *